(12) United States Patent
Song et al.

(10) Patent No.: US 10,728,352 B2
(45) Date of Patent: Jul. 28, 2020

(54) MANAGING DIGITAL FORUMS AND NETWORKING GROUPS UTILIZING A GROUP ACTIVITY INDICATOR

(71) Applicant: Facebook, Inc., Menlo Park, CA (US)

(72) Inventors: Andrew Yaoshu Song, San Francisco, CA (US); Vinodh Jayaram, Fremont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 183 days.

(21) Appl. No.: 15/795,709

(22) Filed: Oct. 27, 2017

(65) Prior Publication Data
US 2019/0132405 A1 May 2, 2019

(51) Int. Cl.
*H04L 29/08* (2006.01)
*H04L 12/58* (2006.01)
*H04W 4/21* (2018.01)
*G06F 3/048* (2013.01)

(52) U.S. Cl.
CPC .............. *H04L 67/24* (2013.01); *H04L 51/32* (2013.01); *H04W 4/21* (2018.02); *G06F 3/048* (2013.01)

(58) Field of Classification Search
CPC ......... G06F 3/048; H04L 51/32; H04L 67/24; H04W 4/08
See application file for complete search history.

(56) References Cited

U.S. PATENT DOCUMENTS

| 10,153,998 B2* | 12/2018 | Snabl | H04L 51/10 |
| 10,218,667 B2* | 2/2019 | Lai | H04L 51/32 |
| 2015/0304432 A1* | 10/2015 | Mallet | G06Q 50/01 709/228 |
| 2016/0014231 A1* | 1/2016 | Le Huerou | H04L 67/36 715/758 |

(Continued)

OTHER PUBLICATIONS

Zheng, W., Zhang, C., Yu, C., Yang, P., Mu, Y., & Zhang, X. (Aug. 2009). Design of presence based dynamic group IM in IMS. In 2009 Fifth International Joint Conference on INC, IMS and IDC (pp. 1219-1222). IEEE. (Year: 2009).*

*Primary Examiner* — Philip J Chea
*Assistant Examiner* — Ruth Solomon
(74) *Attorney, Agent, or Firm* — Keller Jolley Preece

(57) ABSTRACT

One or more embodiments of the present disclosure facilitate effective management of digital forums between networking groups including co-users of a networking system. In particular, systems and methods involve providing a list of digital forums for sharing digital including digital icons indicating corresponding digital forums associated with respective networking groups. Systems and methods further involve determining subsets of active co-users from the networking groups by detecting interactions between client devices of the subsets of active co-users and the networking system. Systems and methods further include generating a group activity indicator and providing the group activity indicator in connection with the graphical icons for corresponding networking groups. Systems and methods described herein further include features and functionality that enable a user of the networking system to view which networking groups are active and comprehend a level of activity for respective networking groups.

20 Claims, 12 Drawing Sheets

(56) References Cited

U.S. PATENT DOCUMENTS

| | | | |
|---|---|---|---|
| 2016/0065897 A1* | 3/2016 | Gottlieb | H04N 7/15 348/14.08 |
| 2016/0261655 A1* | 9/2016 | Aggarwal | H04L 65/4053 |
| 2017/0005977 A1* | 1/2017 | Snabl | H04L 51/10 |
| 2017/0109013 A1* | 4/2017 | Hong | G06F 3/04817 |
| 2017/0251344 A1* | 8/2017 | Patvarczki | H04W 4/21 |
| 2018/0109485 A1* | 4/2018 | Lai | H04L 51/32 |
| 2018/0130138 A1* | 5/2018 | Kumar | H04L 12/185 |

* cited by examiner

MANAGING DIGITAL FORUMS AND NETWORKING GROUPS UTILIZING A GROUP ACTIVITY INDICATOR

BACKGROUND

Recent years have seen rapid development in communication technology, particularly in the capabilities of computing systems to share digital content between user devices. Indeed, conventional computing systems allow users to share content with discrete groups of multiple users via text, chat, instant messaging, social media, and other digital channels using various client devices. For example, utilizing conventional computing systems, users can share digital content including audio files, text messages, images, and other types of digital content with groups of friends and family and receive instant feedback from other users within those groups.

As sharing content with groups of multiple users has increased, individual users have also begun interacting with larger numbers of groups. Indeed, individual users can belong to dozens of different groups for sharing digital content between computing devices of various users. Accordingly, users often find it difficult to effectively interface with members of individual groups. Indeed, over time, many groups have intermittent participation or become totally inactive. Users often experience frustration when sharing content with inactive or intermittently active groups because users are unaware if users of the group are receiving and/or actually viewing the shared content. Moreover, many users become frustrated when they share digital content with other users and receive a delayed response (or no response at all).

These and other problems exist with regard to managing communications between groups of users.

BRIEF SUMMARY

One or more embodiments of the present disclosure provide benefits and/or solve one or more of the foregoing or other problems in the art with systems and methods for managing digital forums with a group activity indicator. In particular, as will be described in further detail below, the systems and methods can improve digital networking groups by monitoring activity across a plurality of client devices and generating group activity indicators based on identified active users within the networking groups. Moreover, the systems and methods can revise group activity indicators as activities of users within networking groups change over time. Accordingly, the systems and methods described herein can enable a user belonging to any number of groups to readily determine whether a networking group has active users that are sharing content and also determine which networking groups would likely be receptive to receiving and communicating digital content within a digital forum for the networking group.

For example, in one or more embodiments, the disclosed systems and methods provide a list of digital forums for sharing digital content via a graphical user interface of a client device. In one or more embodiments, the list includes graphical icons indicating digital forums for sharing content with corresponding networking groups. For instance, in one or more embodiments, the list includes a graphical icon indicating a digital forum for sharing content with a networking group that includes the user of the client device and a plurality of co-users of a networking system. Moreover, in one or more embodiments, the systems and methods determine a subset of active co-users by detecting interactions between client devices. Furthermore, the systems and methods can generate a group activity indicator based on the subset of active co-users (e.g., an activity indicator reflecting the number of active co-users in the subset of active co-users). In addition, the systems and methods can provide the group activity indicator in connection with the graphical icon via the graphical user interface of the client device.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
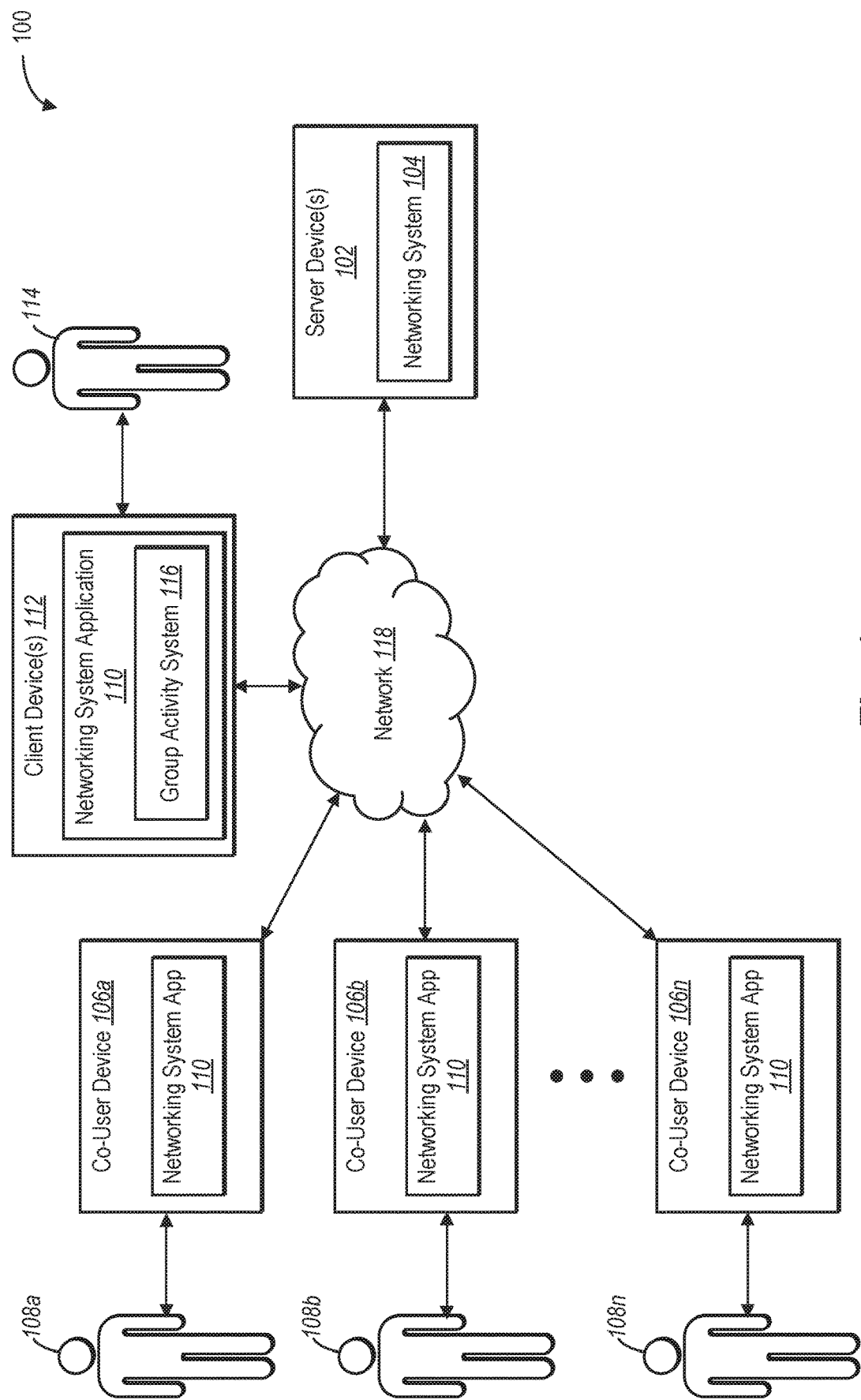
FIG. 1 illustrates a block diagram of an environment in which a group activity system is implemented in accordance with one or more embodiments.

One or more embodiments of the present disclosure include a group activity system that facilitates management of digital forums utilizing group activity indicators. In particular, the group activity system can efficiently manage networking groups by generating and providing group activity indicators that reflect a current activity status for respective networking groups within a networking system. To illustrate, the group activity system can monitor activity data across client devices of users belonging to networking groups. The group activity system can analyze the user activity data by group and generate a group activity indicator (e.g., an indicator of a subset of co-users of the group that are active on the networking system). Moreover, the group activity system can dynamically modify the group activity indicator as user activities change, thus providing a real-time indication of user activity corresponding to various networking groups.

For example, the group activity system can provide a list of digital forums for sharing digital content with networking groups associated with each digital forum. In particular, in one or more embodiments, the group activity system provides graphical icons via a graphical user interface of a client device representative of the digital forums associated with networking groups including the user of the client device and co-users of a networking system. The group activity system can further determine a subset of active co-users from a networking group by detecting interactions between client devices of the subset of active co-users and the networking system. In one or more embodiments, the group activity system generates a group activity indicator based on the determined subset of active co-users. In addition, the group activity system can provide the group activity indicator via the graphical user interface of the client device in connection with a graphical icon associated with the networking group of the active subset of co-users.

The group activity system provides a number of advantages over existing communication systems. For example, the group activity system can cause a client device to provide a graphical user interface including graphical icons that enable a user of the client device to determine whether a networking group is active and whether users of the networking group will be responsive to shared content. In particular, as will be described in further detail below, the group activity system can determine an activity status for each of a plurality of different networking groups by identifying subsets of active users of the networking system who have recently interacted (or are currently interacting) with digital forums. Upon determining the activity status for the respective networking groups, the group activity system can generate and provide a group activity indicator that provides a clear visual indication showing which of the respective networking groups have active users.

In addition, the group activity system can also generate and provide a group activity indicator that enables users to easily comprehend a level of activity associated with networking groups. For example, the group activity system can determine a number of active users of a networking group (e.g., a subset of co-users within a networking group). In one or more embodiments, the group activity system generates and provides a group activity indicator based on the number of these active users. For example, the group activity system can generate a group activity indicator that reflects the number of active users of the networking group. More specifically, in one or more embodiments, the group activity system indicates the level of activity by generating an icon (or other visual indicator) having a particular color, brightness, size or other visual characteristic associated with the determined number of active users, thus enabling the user of the client device to quickly comprehend a level of activity associated with the networking group.

In addition to indicating a number of active users for a networking group, the group activity system can also generate and provide a group activity indicator associated with different types of tracked user interactions with respect to the networking group. For example, the group activity system can determine a subset of active users based on a number of detected interactions by the users of the networking group. In one or more embodiments, the group activity system determines the subset of active users by detecting interactions with the networking system including, by way of example, whether a client device is running a networking system application, whether the networking system application is open on a client device, whether a user is currently viewing a digital forum, whether a user is currently typing a message or sharing digital content with the digital forum, and whether a user has recently added content to the digital forum. The group activity system can generate group activity indicators specific to the particular detected user interactions corresponding to the networking group.

Moreover, in one or more embodiments, the group activity system utilizes the group activity indicator to provide a dynamic representation of an up-to-date, real-time activity status for a networking group. For example, in one or more embodiments, the group activity system detects additional interactions by users of a networking group with respect to the networking system and determines an updated subset of users of the networking group associated with the additional interactions. In response to detecting the additional interactions and based on the updated subset of users of the networking group, the group activity system can generate a modified group activity indicator and provide the modified group activity indicator in connection with a graphical icon associated with the networking group. In this way, the group activity system can provide a dynamic group activity indicator that provides a current activity status for the networking group to a user of the client device.

The group activity system can operate in conjunction with a variety of digital forums. For example, in one or more embodiments, the group activity system can generate group activity indicators for group instant messaging threads, chat forums, social networking groups, and ephemeral digital forums that include ephemeral digital content (e.g., content that users can access for a predefined period of time). To illustrate, the group activity system can provide a group activity indicator reflecting the number of co-users that have accessed ephemeral digital content in an ephemeral digital forum within a threshold period of time.

In one or more embodiments, the group activity system generates and provides a group activity indicator while efficiently utilizing processing resources of a networking system. For example, in one or more embodiments, client devices of users within respective networking groups share activity information with other users of the networking group by transmitting activity information between client devices. In particular, in one or more embodiments, the client devices broadcast, multicast, or otherwise transmit presence data, activity data, and other information associated with interactions with the networking system, thereby enabling client devices to generate and provide the group activity indicator without overloading the networking system. In this way, even where a networking system is hosting millions of different networking groups, the group activity system can nonetheless provide activity indicators for a manageable number of networking groups to which a user belongs without overloading one or more server devices of the networking system.

In addition, even where certain features described herein are not performed locally on client devices, one or more embodiments of the group activity system nonetheless reduce the overall load on the networking system by cooperating with client devices of users of the networking system. For example, the networking system can cooperate with a group activity system on a client device by providing presence information and shared digital content as it becomes available via the digital forum and enabling the group activity system to locally determine an activity status for the networking group at each respective client device. In this way, the group activity system need not maintain an up-to-date activity status for every networking group and push the activity status to every client device connected to the networking system. Rather, the networking system can host the digital forums while utilizing client devices to locally determine and provide group activity indicators to users of the networking system, thus conserving processing resources of the networking system.

Moreover, the group activity system also improves computing systems by providing a user interface that allows users to more efficiently and easily navigate through complex digital content. Indeed, the group activity system can reduce the number of user interactions to identify and provide digital content, reduce search times, and increase efficiency in managing hundreds (or thousands) of digital forums that include digital content shared between a user and other co-users. Indeed, the group activity system can dynamically update a user interface with group activity indicators that not only indicate a number of group members, but reflects subsets of groups interacting with a networking system. Thus, users can easily identify not only networking groups that have new content, but identify groups that are active and ready to engage through a digital forum in real time.

Additional detail will now be provided regarding the group activity system in relation to illustrative figures portraying exemplary embodiments. For example, FIG. 1 illustrates a block diagram of an example communication environment 100 for managing networking groups utilizing a group activity indicator in accordance with one or more embodiments. As illustrated in FIG. 1, the communication environment 100 includes a server device(s) 102 that also includes a networking system 104. The communication environment 100 further includes co-user client devices 106a-n (or simply "co-user devices 106a-n") associated with respective co-users 108a-n. As shown in FIG. 1, each of the co-user devices 106a-n include a networking system application 110. As further shown in FIG. 1, the networking system 100 also includes a client device 112 (associated with a user 114) that includes a networking system application 110. The networking system application 110 on the client device 112 further includes a group activity system 116. In one or more embodiments, each of the networking system applications 110 on the co-user devices 106a-n similarly include a group activity system 116 that provides similar features and functionality as the group activity system 116 on the client device 110. Nonetheless, for the sake of explanation, one or more embodiments described herein relate specifically to a group activity system 116 implemented on the client device 112.

As shown in FIG. 1, each of the server device(s) 102, the co-user devices 106a-n, and the client device 112 can communicate over a network 118. The network 118 may include one or multiple networks and may use one or more communication platforms or technologies suitable for transmitting data. In one or more embodiments, the network 118 includes the Internet or World Wide Web. In addition, or as an alternative, the network 118 can include various other types of networks that use various communication technologies and protocols. Additional details relating to the network 118 are explained below in reference to FIG. 9.

Although FIG. 1 illustrates a particular number and arrangement of co-user devices 106a-n and client device 112, it will be understood that the communication environment 100 can include any number of devices, including any number of server devices 102, co-user devices 106a-n, and client device 112. Moreover, one or more of the devices may directly communicate with the server device(s) 102 or via an alternative communication network, bypassing the network 118.

In addition, the co-user devices 106a-n and client device 112 may refer to various types of computing devices. For example, one or more of the devices may include a mobile device such as a mobile telephone, a smartphone, a PDA, a tablet, or a laptop. Additionally, or alternatively, one or more of the devices may include a non-mobile device such as a desktop computer, a server, or another type of computing device. Additional detail with regard to different types of computing devices is described in reference to FIG. 8.

The networking system 104 can refer to various types of networking systems including, for example, a social networking system, an electronic messaging system, or other type of networking system over which a community of users and co-users can share and access digital content. As such, while one or more examples described herein refer specifically to a social networking system, it will be understood that features and functionality described in connection with a social networking system can similarly apply to other types of networking systems. Additional detail with regard to the networking system 104, and particularly an example social networking system, is described below in connection with FIGS. 9-10.

In addition, as shown in FIG. 1, each of the co-user devices 106a-n and the client device 112 include a networking system application 110. In one or more embodiments, the networking system application 110 (e.g., a social networking system application and/or electronic messaging application) refers to a software application associated with the networking system 104. In one or more embodiments, the networking system application 110 provides and controls various features and functionality on the co-user devices 106a-n and client device 112 to enable respective users 108a-n and 114 to interact with other users of the networking system 104 including sharing and interacting with digital content as well as sending communication between groups of users via one or more digital forums. In one or more embodiments, the networking system application 110 refers to a native or hybrid application installed on a respective computing device. Alternatively, in one or more embodiments, the networking system application 110 refers to a web browser used to access the networking system 104 (e.g., a website associated with the networking system 104 provided via a web browser on a respective computing device). In one or more embodiments, the networking system application 110 refers to the same application on each of the co-user devices 106a-n and client device 112.

In one or more embodiments, the communication environment 100 enables users (e.g., members) of the networking system 104 to communicate and/or share digital content with other users of the networking system 104. In particular, as will be described in further detail below, the communication environment 100 facilitates creation of digital forums within which groups of users of the networking system 104 can share digital content and communicate with other users within the group. For example, in one or more embodiments, the communication environment 100 enables a user 114 to create or join a networking group within which the user 114 and various co-users (e.g., co-users 108a-n) can communicate via a digital forum provided by the networking system 104.

As used herein, a "user" or "co-user" of the networking system 104 refers to any user or other entity having access to digital content shared via a networking platform of the networking system 104. A user or co-user also refers to a user of other entity having the capability to share digital content with other users of the networking system 104. For example, a user or co-user can refer to any entity having an account and/or profile registered with the networking system 104 and which enables an associated user to communicate with other users of the networking system 104 including sharing and interacting with digital content. In addition, users or co-users can share and interact with digital content shared via digital forums hosted by the networking system 104.

As used herein, a "digital forum" refers to a digital medium for sharing digital content. In particular, the term "digital forum" includes a virtual space over which users of the networking system 104 can communicate and share digital content. For example, in one or more embodiments, the networking system 104 creates a digital forum based on a request by a user of the networking system 104 to share digital content with other users of the networking system. To illustrate, the term "digital forum" can include a chat room, instant messaging forum, social networking group space, or ephemeral messaging forum. Moreover, in one or more embodiments, the networking system 104 adds one or more users to a digital forum providing access to digital content shared via the digital forum. In one or more embodiments, the networking system 104 manages access to digital forums by providing access to digital content on the digital forum to specific groups of users of the networking system 104.

As used herein, a "digital content item" or "digital content" refers to a defined portion of digital data (e.g., a data file). In particular, the term digital content item includes digital text, digital characters (e.g., emoji or other standardized characters), digital images, digital videos, digital overlays (e.g., stickers or filters), or audio files. In one or more embodiments described herein, digital content refers to digital text, a digital image, digital video, or other digital media posted to the networking system 104 by any user of the networking system 104. In addition, as further used herein, "ephemeral digital content" refers to digital content shared via a networking system 104 made available to one or more users for a limited period of time. In particular, ephemeral digital content includes digital content shared between users of the networking system 104 made unavailable after a predefined period of time. For example, in one or more embodiments, ephemeral digital content refers to a user's "story" or "day" within a networking system 104 (e.g., a social networking system).

Similarly, as used herein, the term "ephemeral digital forum" refers to a digital forum that includes ephemeral digital content. As an example, the networking system 104 can create (e.g., host) an ephemeral digital forum to which a user can add any number of ephemeral digital content items (e.g., digital text, digital images, and/or digital videos) to share with co-users of the networking system. In addition, in one or more embodiments, the ephemeral digital content items and/or the digital forum itself becomes unavailable to the co-users of the networking system 104 after a predefined period of time.

As used herein, a "networking group" (or "group" of co-users) refers to a plurality of users of a networking system. In particular, the term "networking group" includes a plurality of users of the networking system 104 having access to a digital forum. For example, the term "networking group" includes a plurality of co-users participating in an instant messaging thread, a plurality of co-users having access to a closed or limited chat room, a plurality of co-users belonging to a social networking group, or a plurality of co-users sharing an ephemeral messaging forum. In one or more embodiments, a user of the networking system 104 can belong to any number of networking groups providing access to corresponding digital forums associated with each of the respective networking groups. Each networking group can refer to a discrete set of users of the networking system. While many groups include entirely different sets of users of the networking system 104, in one or more embodiments, networking groups can include overlapping sets of members including many of the same members as well as one or more additional members. As an example, a first networking group can include the user 114 and a first user 108*a* of the first client device while a second networking group can include the user 114, the first user 108*a*, and one or more additional co-users of the networking system 104 that are not a part of the first networking group. As another example, a third networking group can include the user 114 and additional co-users of the networking system 104 other than the first co-user of the first co-user device 106*a*.

In one or more embodiments, the user 114 communicates with other users of the networking system 104 via digital forums associated with various networking groups. For example, in one or more embodiments, the networking system 104 hosts digital forums and manages (e.g., controls or limits) access to the respective digital forums via networking groups including various users of the networking system 104. For instance, the networking system 104 can host a number of digital forums associated with networking groups to which the user 114 of the client device 112 belongs and provide access to each of the digital forums based on membership of the user 114 within the respective networking groups. Thus, the networking system 114 can manage digital forums by adding and/or removing individual users to various networking groups and then controlling access to the digital forums based on the individual users that belong to networking groups corresponding to each digital forum.

In addition to managing digital forums and respective networking groups, the communication environment 100 further facilitates providing an indication of group activity for one or more of the networking groups associated with the respective digital forums. For example, in one or more embodiments, the group activity system 116 determines a level of activity associated with different networking groups to which the user 114 belongs. In particular, the group activity system 116 can determine a subset of active co-users of a networking group by detecting interactions between associated co-user devices and the networking system 104. As used herein, an "active co-user" refers to any user of the networking system 104 determined to have an active status with respect to the networking system 104 and/or a specific digital forum. For example, an active co-user may refer to a member of a networking group currently interacting with the networking system 104, with a digital forum, or who has recently interacted with the networking system 104 and/or digital forum. As will be described in further detail below, the group activity system 116 can identify different types of activity with respect to the networking system 104 and identify active co-users of respective networking groups based on the different types of activity.

Upon identifying active co-users of the networking group(s), the group activity system 116 can generate a group activity indicator based on the determined level of activity for one or more networking groups. As used herein, a "group activity indicator" refers to a visual, audio, heptic or other type of indicator that indicates networking group activity. In particular, a group activity indicator includes a visual element that reflects a subset of active co-users within a networking group. For instance, in relation to FIG. 1, a group activity indicators refers to an indicator that denotes to the user 114 of the client device 112 a level of activity associated with a networking group. As will be described in further detail below, the group activity system 116 can generate different types of group activity indicators to indicate different types and levels of activity associated with respective networking groups.

In addition to generating the group activity indicator, the group activity system 116 can further provide the group activity indicator via a graphical user interface of the client device 112. For example, as will be described in further detail below, the group activity system 116 can provide graphical icons representative of digital forums associated with respective networking groups and provide the group activity indicator in connection with the graphical icons. In this way, the user 114 of the client device 112 can readily see and comprehend a level of activity associated with each networking group for the different digital forums for which the user 114 has access.

Although FIG. 1 illustrates the group activity system 116 as implemented entirely on the client device 112, the group activity system 116 can be implemented on a variety of different devices. For example, in one or more embodiments the group activity system 116 is implemented on any number of the co-user devices 106a-n. In addition, in one or more embodiments, the group activity system 116 can be implemented partially or entirely within the networking system 104 on the server device(s) 102. For example, in one or more embodiments, the networking system 104 can determine a level of activity for a networking group and push information to the client device 112 that enables the networking system application 110 to provide a group activity indicator via a graphical user interface on the client device 112. Thus, the group activity system 116 can be implemented in whole, or in part, on the server device(s) 102, the co-user devices 106a-106n, and/or the client device(s) 112. Further, as will be described in further detail below, the server device(s) 102, co-user devices 106a-n, and client device 112 can send and receive group activity data with respect to the networking system 104 in a variety of ways.

Additional detail will now be given with respect to generating and providing a group activity indicator via a graphical user interface of a client device. For example, FIGS. 2A-2D illustrate a mobile device 202 having a graphical user interface 204 that includes example messaging interfaces in accordance with one or more embodiments of the group activity system 116. In particular, as shown in FIGS. 2A-2D, the group activity system 116 generates a graphical user interface 204. As illustrated, the graphical user interface 204 includes a header 206 and footer 208 including selectable options that enable a user of the mobile device 202 to interact with various networking groups of co-users, create one or more new networking groups, join (or leave) one or more existing networking groups, and otherwise utilize features and functionality facilitated by the group activity system 116. In one or more embodiments, the mobile device 202 refers to an example client device 112 (or one of the co-user devices 106a-106n) described above in connection with FIG. 1.

As further shown in FIGS. 2A-2D, the group activity system 116 generates the graphical user interface 204 to include a list of graphical icons 210a-d associated with digital forums and corresponding networking groups. In particular, each of the graphical icons 210a-d include a selectable icon that enables a user of the mobile device 202 to access a digital forum associated with a corresponding networking group.

For example, the graphical user interface 204 includes a first graphical icon 210a associated with a digital forum (e.g., an instant messaging thread) corresponding to a first networking group that includes a first set of co-users of the networking system 104. The graphical user interface 204 further includes a second graphical icon 210b associated with a second digital forum (e.g., an instant messaging thread) corresponding to a second networking group that includes a second set of co-users of the networking system 104. Similarly, the graphical user interface 204 includes a third graphical icon 210c and a fourth graphical icon 210d associated with digital forums corresponding to different social networking groups.

Figure 2A:
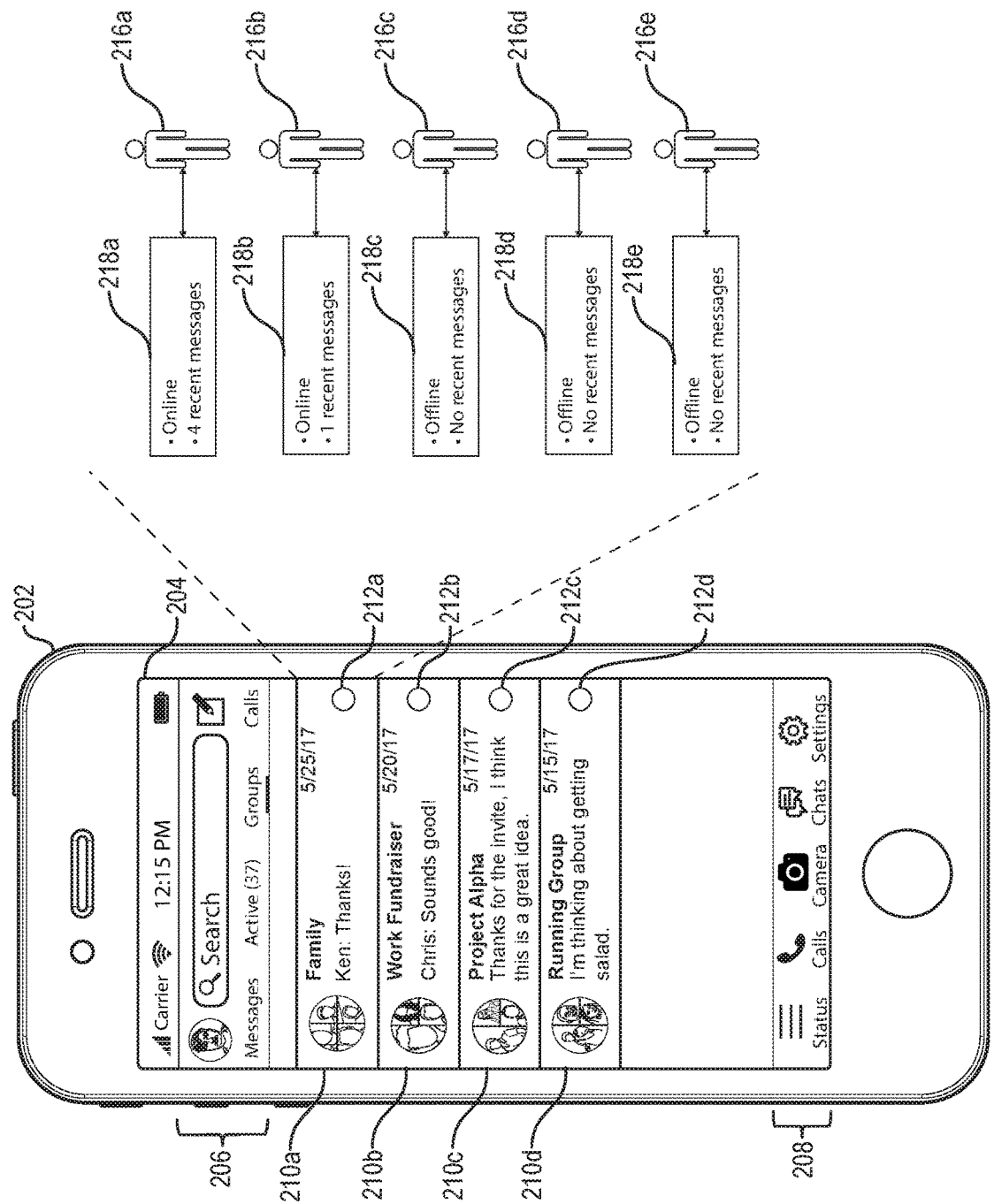
FIGS. 2A-2D illustrate example graphical user interfaces including group activity indicators in accordance with one or more embodiments.

As shown in FIG. 2A, each of the graphical icons 210a-d include information associated with each of the networking groups. For example, the first graphical icon 210a includes a name ("Family") of the networking group and a profile icon that includes a digital image reflecting one or more members of the networking group. In addition, the first graphical icon 210a includes an identifier of a user ("Ken") who most recently added content to the digital forum as well as a portion of the content ("Thanks!") added to the digital forum. As further shown, the first graphical icon 210a includes a time (e.g., a date) of the most recent addition of content to the digital forum. Each of the second, third, and fourth graphical icons 210b-d include similar information within the respective graphical icons 210b-d.

As mentioned above, the group activity system 116 can generate and provide one or more group activity indicators via a user interface. For example, as shown in FIGS. 2A-2D, the group activity system 116 generates each of the graphical icons 210a-210d to include one or more group activity indicators. In particular, the group activity system 116 generates the graphical icons 210a-210d to include group activity indicators that reflect an activity level of users from the networking groups with respect to the networking system 104.

For example, as shown in FIG. 2A, the group activity system 116 generates group activity indicators 212a-d. In particular, the group activity system 116 generates group activity indicators 212a-d for each of the digital forums and corresponding networking groups associated with the graphical elements 210a-210d. Specifically, the group activity system 116 generates the group activity indicators 212a-212d to reflect a number of active co-users of each networking group.

For example, with respect to the first graphical element 210a, the group activity system 116 generates a group activity indicator 212a that reflects the number of active co-users of the networking group corresponding to the first graphical element 210a. In particular, the group activity indicator 212a provides an indication of the number (e.g., percentage) of the active co-users. For example, group activity indicator 212a shows that fewer than a threshold number or percentage (e.g., less than 50%) of the networking group is currently active or otherwise engaged in a particular type of activity with respect to the networking system 104 (e.g., thus the group activity indicator 212a is not highlighted).

In one or more embodiments, the group activity system 116 identifies a subset of active co-users from all of the co-users of a networking group. Moreover, the group activity system 116 determines a number of active co-users in the subset of co-users, generates one or more group activity indicators based on the number of active co-users, and provides the group activity indicator(s) via a graphical user interface of the mobile device 202. As will be discussed further, the group activity system 116 can additionally identify different types of activity with respect to the networking system 104 and generate one or more group activity indicators (or modify existing group activity indicators) associated with respective types of activity or actions of the active co-users. In addition, as will be described in further detail below, the group activity system 116 can dynamically update one or more of the group activity indicators based on detected activities of the active co-users with respect to the networking system 104.

In one or more embodiments, the group activity system 116 identifies active co-users and generates a corresponding group activity indicator based on interactions of the co-users with respect to the networking system 104. As an example, with respect to the first networking group corresponding to the first graphical element 210a, FIG. 2A shows that the first networking group includes five co-users 216a-e. In addition, FIG. 2A shows associated co-user interactions 218a-e for each of the co-users 216a-e. It will be understood that the co-users 216a-e may or may not include the user of the mobile device 202. For example, the first co-user 216a may refer to the user of the mobile device 202. Alternatively, each of the co-users 216a-e may refer exclusively to other users of the networking system 104 having access to the digital forum associated with the corresponding first networking group. For ease in explanation herein, the co-users 216a-e each refer to co-users of the networking system 104 other than the user of the mobile device 202.

FIG. 2A shows co-user interactions 218a-e for the co-users 216a-e of the first networking group. In particular, as shown in FIG. 2A the group activity system 116 detects first co-user interactions 218a indicating that a first co-user 216a is presently online (e.g., connected and/or logged in to the networking system 104 or otherwise connected to a network, such as the Internet) and has posted four recent messages to a digital forum associated with the first networking group. FIG. 2A further shows that the group activity system 116 detects second co-user interactions 218b indicating that a second co-user 216b is presently online and has posted one recent message to the digital forum. FIG. 2A further indicates that the group activity system 116 detects that none of the third, fourth, and fifth co-users 216c-e are presently online and that none of the third, fourth, and fifth co-users 216c-e have posted any recent messages to the digital forum.

Based on the co-user actions 218a-e, the group activity system 116 identifies a level of activity for the networking group. For example, the group activity system 116 identifies a subset of co-users from the group of co-users 216a-e within the networking group that are active. In the example shown in FIG. 2A, the group activity system 116 determines that the first co-user 216a and the second co-user 216b are online while the third co-user 216c, fourth co-user 216d, and fifth co-user 216e are offline. Accordingly, even though the group activity system 116 may determine that the first co-user 216a and second co-user 216b are active based on the online status, the group activity system 116 may nonetheless determine that the networking group is not active (e.g., because the number of active co-users falls below a threshold number or percentage of co-users of the networking group to be considered active).

For instance, with respect to the example shown in FIG. 2A, the group activity system 116 determines that the first co-user 216a and the second co-user 216b are "active" based on detecting that each are currently online. As an alternative, the group activity system 116 can determine that the first co-user 216a and the second co-user 216b are each individually active based on identifying that each of the first co-user 216a and second co-user 216b have recently posted one or more messages to the digital forum. As will be described below, the group activity system 116 can determine a level of group activity based on identifying a number of co-users having an individual active status.

As mentioned above, the group activity system 116 can identify active co-users based on a variety of detected activities with respect to the networking system 104 (e.g. online/offline status). For instance, as mentioned above, the group activity system 116 can identify a co-user as active whose client device is logged into an account associated with the networking system 104 (e.g., authenticated via a username and password or other authentication protocol). As another example, the group activity system 116 can identify a co-user as active where the networking system application 110 is running on an associated client device. For instance, the group activity system 116 can determine that a user is active when the networking system application 110 is running in the foreground (or background) on a client device associated with the user. As another example, the group activity system 116 can determine that a user is active based on a determination that a user has recently utilized one or more features of the networking system application 110 (e.g., posted a message, shared content, viewed content, etc.).

In addition to identifying active co-users based on detected interactions of the co-users with respect to the networking system 104 generally, the group activity system 116 can also identify active co-users based on actions of the co-users with respect to specific digital forums. For example, as will be described in further detail below, the group activity system 116 can determine that a co-user is active based on a determination that the co-user has viewed a digital forum, is presently viewing the digital forum, or has recently interacted with the digital forum (e.g., shared content, added a comment, sent a direct message to another co-user within the digital forum). Accordingly, while FIG. 2A shows one example in which co-users are identified as active based on a detected online status, the group activity system 116 can similarly identify one or more active users based on interactions with respect to the digital forum. As a result, in one or more embodiments, the group activity system 116 may identify a co-user as active for one digital forum while simultaneously inactive for one or more additional digital forums.

Figure 2B:
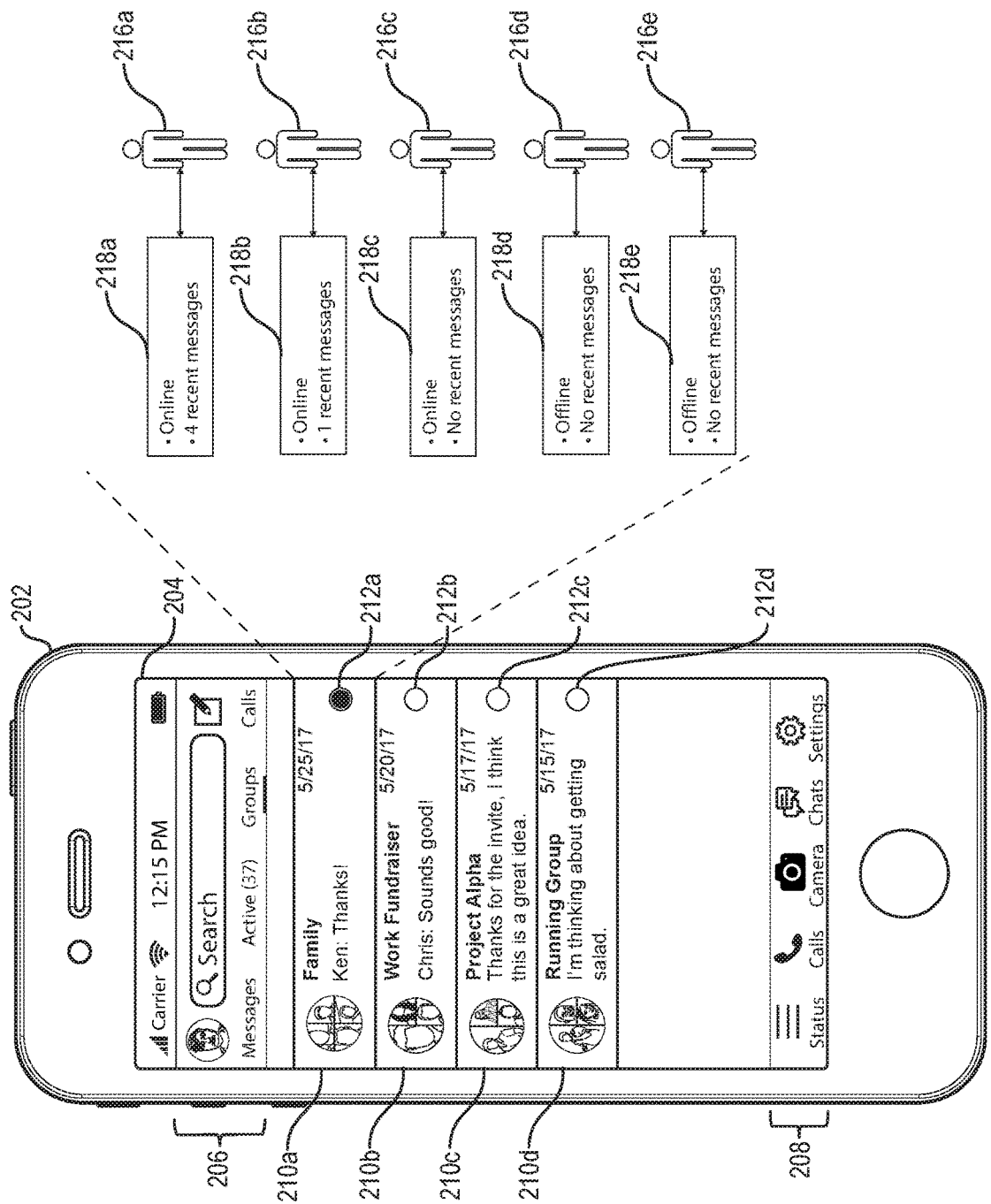

In one or more embodiments, the group activity system 116 receives updated information about detected interactions of co-users with respect to the networking system 104 and updates one or more group activity indicators based on the updated information. For example, FIG. 2B illustrates an example graphical user interface 204 in which the group activity system 116 has detected one or more additional co-user interactions with respect to the networking system 104 and updated the group activity indicator 212a within the first graphical icon 210a for the networking group including the co-users 216a-e. In particular, the group activity system 116 determines that the co-user interactions 218a-e differ from those discussed above in connection with FIG. 2A in that the third co-user 216c is online.

Based on detecting that each of the first three co-users 216a-c are online, the group activity system 116 updates the group activity indicator 212a. In particular, the group activity system 116 determines that three co-users are thus active, and, based on this determination, updates the group activity indicator 212a to indicate that the networking group is "active." For example, as mentioned above, the group activity system 116 can identify that a networking group is active based on determining that the number of active co-users equals or exceeds a threshold number or percentage. For instance, in the example shown in FIG. 2B, where the group activity system 116 determines that the number of active co-users exceeds 50% of the total number of co-users within the networking group, the group activity system 116 provides the group activity indicator 212a indicating that the first networking group is "active." Alternatively, if the number of active co-users falls below the threshold value of 50%, the group activity system 116 may remove the group activity indicator 212a or otherwise change an appearance of the group activity indicator 212a (e.g., as shown in FIG. 2A) to show an inactive status for the first networking group.

In generating and providing the group activity indicator 214a, the group activity system 116 can indicate an active status for the networking group in a variety of ways. For example, as shown in FIG. 2B, the group activity system 116 can provide a solid colored group activity indicator 212a in place of a white or non-solid indicator (as shown in FIG. 2A) to indicate that the number of active co-users exceeds a minimum threshold. In one or more embodiments, the group activity system 116 modifies a color or brightness of the group activity indicator 212a to indicate an active status for the networking group. In addition, in one or more embodiments, the group activity system 116 modifies a size or shape of the group activity indicator to indicate an activity level (e.g., an active or inactive status) for the networking group. As an example, the group activity system 116 can change the group activity indicator from a circle to a square to indicate a change from an active status to inactive status.

In one or more embodiments, the group activity system 116 further indicates a level of activity for the networking group via the group activity indicator 212a. Indeed, as the networking group becomes more or less active (e.g., additional or fewer co-users log onto the networking system 104), the group activity system 116 can modify the group activity indicator 212a to indicate a different level of activity. For example, the group activity system 116 can dynamically compare a current number of active co-users to multiple threshold values and change a color of the indicator, increase/decrease a brightness of the indicator, enlarge/shrink a size of the indicator, change a shape of the activity indicator, or otherwise modify the group activity indicator based on a comparison between the current number of active co-users and a range of multiple threshold values.

Figure 2C:
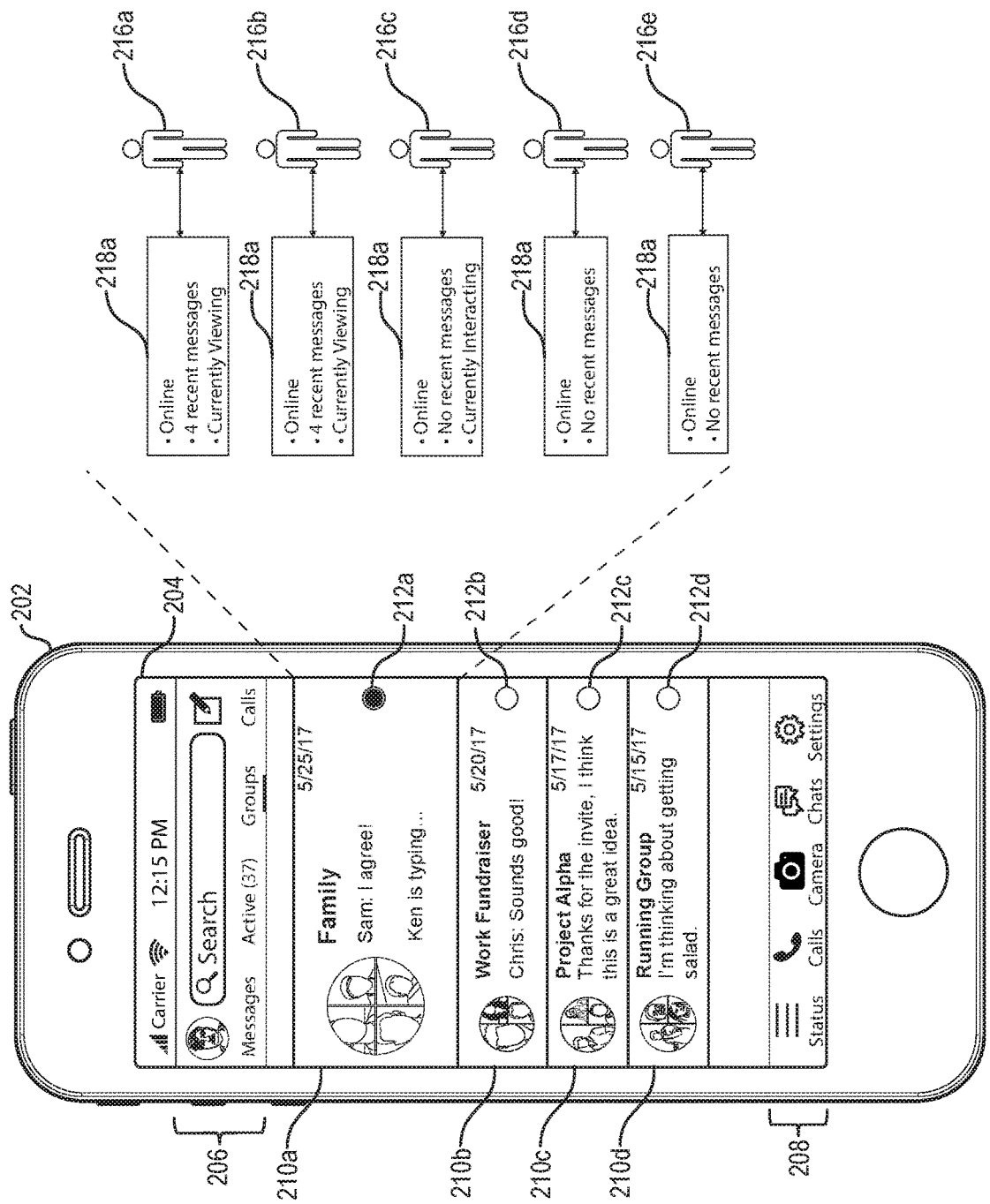

The group activity system 116 can modify a group activity indicator in a variety of ways to indicate a level of activity of a networking group. For example, FIG. 2C illustrates another example graphical user interface 204 in which the group activity system 116 identifies and provides an indication based on an identified number of active co-users of the first networking group. For example, as shown in FIG. 2C, in addition to providing the group activity indicator 214a, the group activity system 116 additionally enlarges the graphical icon 210a for the corresponding digital forum based on detected co-user interactions 218a-e of the co-users 216a-e. In particular, as shown in FIG. 2C, the co-user interactions 218a-e indicate that each of the first, second, third, and fourth co-users 216a-d are online, the first and second co-users 216a-b are currently viewing the digital forum, and the third co-user 216c is currently interacting with the digital forum (e.g., composing a message, adding a comment, sharing content).

Based on detecting such a high level of activity (e.g., satisfying a variety of thresholds, such as a threshold number of online users, a threshold number of users running a networking application, a threshold number of users viewing the digital forum, and/or a threshold number of users interacting with the digital forum) of the co-users 216a-e, the group activity system 116 provides another group activity indicator. For example, the group activity system 116 provides a group activity indicator by enlarging the first graphical icon 210a. Specifically, as shown in FIG. 2C, the group activity system 116 enlarges the first graphical icon 210a based on detecting that a threshold number of the co-users 216a-e are active with respect to the digital forum corresponding to the first networking group (e.g., the co-users satisfy various thresholds as mentioned above). In addition, as shown in FIG. 2C, the group activity system 116 provides an indication that the third co-user 218c is typing a message within the digital forum.

Accordingly, in one or more embodiments, the group activity system 116 may provide different group activity indicators to indicate different types of activity. For example, with respect to the first graphical icon 210a, the group activity system 116 provides a group activity indicator 212a to reflect a number of co-users (e.g., to indicate that the number of active co-users exceeds a threshold, such as a threshold number of 3 co-users or a threshold percent of 50% of the co-users) for the networking group. Further, the group activity system 116 additionally provides a group activity indicator by enlarging the graphical icon 210a to indicate a number of the co-users 216a-e currently active with respect to the digital forum (e.g., currently viewing, currently interacting).

In addition to providing a group activity indicator for each respective networking group, the group activity system 116 can additionally organize the graphical icons 210a-d in accordance with determined activity levels. For example, in one or more embodiments, in response to determining that the networking group for the first digital forum is active, the group activity system 116 pushes the first graphical icon 210a to the top of the list of graphical icons 210a-d. In one or more embodiments, the group activity system 116 orders the graphical icons 210a-d in descending value based on determined levels of activity (e.g., number of active co-users, percentage of active co-users).

Figure 2D:
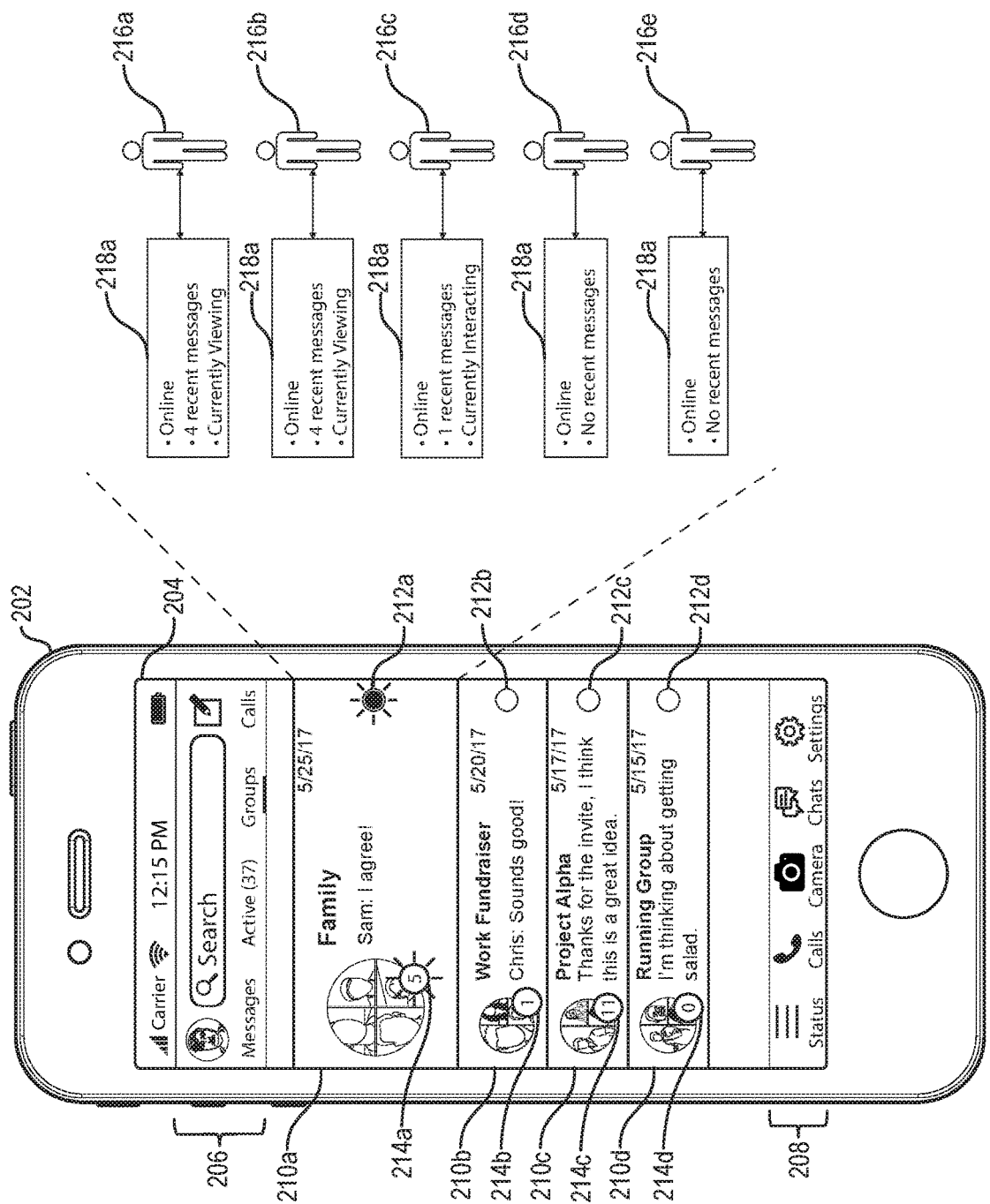

The group activity system 116 can also provide a variety of additional group activity indicators. For example, FIG. 2D illustrates another example graphical user interface 204 in which the group activity system 116 identifies and provides a group activity indicator based on an identified number of active co-users of the first networking group. For example, as shown in FIG. 2D, in addition to providing the group activity indicator 212a and enlarging the graphical icon 210a for the corresponding digital forum, the group activity system 116 also provides a numerical group activity indicator 214a together with a modification to the group activity indicator 212a to indicate one or more real-time interactions of the co-users 216a-e with respect to the digital forum. As further shown in FIG. 2D, the group activity system 116 provides numeric group activity indicators 214a-d within each graphical icon 210a-d indicating a number of active co-users within the networking groups.

For example, as shown in FIG. 2D, the group activity system 116 detects co-user interactions 218a-e including interactions by the co-users 216a-e with respect to the digital forum. In particular, as shown in FIG. 2D, the group activity system 116 detects that the first co-user 216a, second co-user 216b, and the third co-user 216c are currently viewing the digital forum. In addition, as shown in FIG. 2D, the group activity system 116 detects that the fourth co-user 216a and the fifth co-user 216e are currently interacting with the digital forum (e.g., composing a message, adding a comment, sharing content).

With respect to the first graphical element 210a, the group activity system 116 generates a numerical group activity indicator 214a that reflects a number of active co-users of the corresponding networking group. In particular, the group activity system 116 generates the numerical group activity indicator 214a for the first graphical element 210a that includes an indication that the "Family" networking group includes two active co-users. Similarly, with respect to the second, third, and fourth graphical elements 208b-d, the group activity system 116 generates numerical group activity indicators 214b-d associated with a number of active co-users for each of the corresponding networking groups.

As further shown in FIG. 2D, the group activity system 116 also indicates user interactions with the digital forum by causing the second group activity indicator 214a to blink. Specifically, the group activity system 116 causes the second group activity indicator 214a to blink based on a threshold number of co-users engaging in real-time interactions with respect to the digital forum (e.g., viewing the digital forum or composing a message). Accordingly, the group activity system 116 can provide a real-time activity indicator for each instance of activity with respect to the digital forum upon detecting each co-user action by the group activity system 116.

Although FIG. 2 illustrates a blinking group activity indicator, the group activity system 116 can utilize a variety of different indicators in response to detected user interactions. For example, the group activity system can change colors, increase or decrease brightness, increase or decrease size, move, shake, or otherwise change a group activity indicator to indicate a level of activity for the networking group with respect to a digital forum.

Moreover, as shown in FIGS. 2A-2D, the group activity system 116 can provide one or multiple group activity indicators in connection with a graphical icon for a corresponding digital forum that illustrates a number of active co-users for a networking group as well as indicating one or more types of co-user actions with respect to the networking system 104 and/or the digital forum. It will be understood that FIGS. 2A-2D illustrate features and functionality of the group activity system 116 by way of example, and is not intended to be limiting to the specific examples shown therein.

Although FIGS. 2A-2D illustrate particular group activity indicators based on particular user interactions, the group activity system 116 can utilize a variety of different group activity indicators that correspond to a variety of different user interactions. For example, the group activity system 116 can provide a first group activity indicator based on a number of co-users running the networking application 110, a second group activity indicator based on a number of co-users interacting with a digital forum, and a third group activity indicator based on a number of co-users typing a digital message. In short, the group activity system 116 can provide one or more group activity indicators or modify one or more group activity indicators based on any of the user interactions described herein.

As shown in FIGS. 2A-2D, the group activity system 116 can provide a listing of graphical icons corresponding to respective digital forums with which a user can interact to share digital content and communicate with co-users of an associated networking group. In addition, in one or more embodiments, the group activity system 116 causes the mobile device 202 to provide a graphical user interface of the digital forum(s) based on detecting a user selection of a corresponding graphical icon. For example, in one or more embodiments, upon detecting a selection of the first graphical icon 210a, the group activity system 116 causes the mobile device 202 to provide a graphical user interface for the corresponding digital forum associated with the first networking group (e.g., a user interface with an instant messaging thread, chat forum, or ephemeral digital forum). Upon providing the graphical user interface of the digital forum, a user of the mobile device 202 can interact with the digital forum in a variety of ways. For example, the user can comment on previously shared digital content. In addition, the user can add or share digital content to the digital forum. In one or more embodiments, the group activity system 116 enables the user to invite one or more additional co-users to the networking group and provide access to digital forum to the one or more additional co-users. In one or more embodiments, the group activity system 116 further enables the user to send messages to the networking group collectively and/or discrete subsets of the co-users within the networking group.

Figure 3:
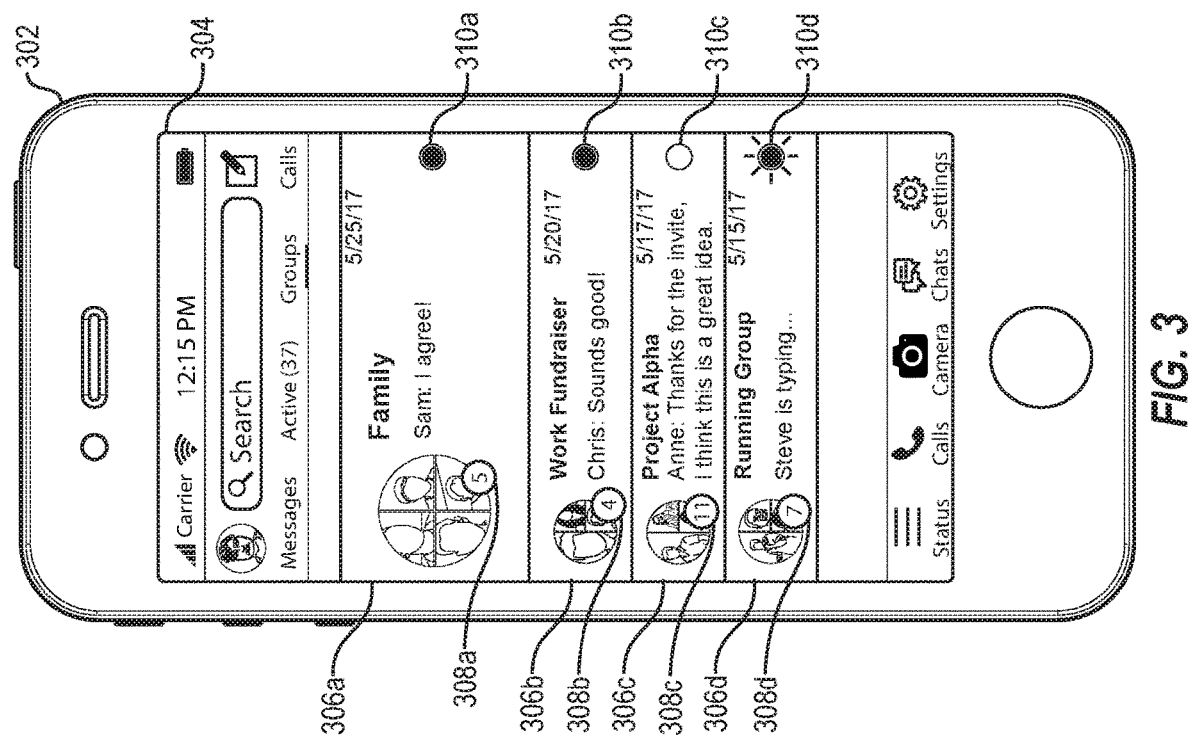
FIG. 3 illustrates a computing device portraying an example graphical user interface including group activity indicators in accordance with one or more embodiments.

As mentioned above, the group activity system 116 can provide a variety of different group activity indicators with regard to a variety of different digital forums. Indeed, as further shown in FIG. 3, the group activity system 116 can provide group activity indicators for a plurality of digital forums and corresponding networking groups. For example, FIG. 3 shows a mobile device 302 including a graphical user interface 304 including similar features as the mobile device 202 and graphical user interface 204 described above in connection with FIGS. 2A-2D. As further shown in FIG. 3, the graphical user interface 304 includes a list of graphical icons 306a-d indicating corresponding digital forums for associated networking groups.

As further shown in FIG. 3, the group activity system 116 provides a plurality of group activity indicators reflecting the number of active co-users corresponding to each digital forum and networking group. The group activity system 116 further provides group activity indicators reflecting types of interactions of the active co-users with respect to the networking system 104 and/or respective digital forums. For example, each of the graphical icons 306a-d include a numerical group activity indicator 308a-d that includes a number of active co-users corresponding to each digital forum and networking group. Moreover, the first graphical icon 306a and second graphical icon 306b each include group activity indicators 310a-b having a solid color indicating that the first and second networking groups have an active status (e.g., a threshold number of co-users from the networking groups are logged into the networking system 104).

As mentioned above, the group activity system 116 can generate group activity indicators that also indicate that a threshold number of co-users are active with respect to the digital forum. For example, the group activity system 116 may generate a group activity indicator based on a variety of different co-user actions with respect to the digital forum. For instance, the group activity system 116 may determine a level of activity based a number of co-users that have recently interacted with the digital forum, a number of co-users actively viewing the digital forum, a number of co-users currently interacting with the digital forum, or a number of co-users interacting with the digital forum in other ways.

Indeed, as shown in FIG. 3, the third graphical icon 306c includes a group activity indicator 310c indicating one or more real-time co-user actions with respect to the digital forum (and/or networking system 104) for the corresponding networking group. Specifically, in response to detecting that a user is actively typing a message within the digital forum, the group activity system 116 causes the second group activity indicator 310c to flash (or change colors, appear brighter, or otherwise change appearance) to indicate the detected co-user action(s) with respect to the digital forum.

As further shown in FIG. 3, the fourth graphical icon 306d includes a group activity indicator 310d indicating an inactive status for a networking group associated with the corresponding digital forum. For example, the group activity system 116 may identify that the networking group corresponding to the fourth graphical icon 306d has fewer active co-users than threshold number or percentage of co-users and cause the second group activity indicator 310d to have a white color, gray color, or other color to indicate that the networking group has an inactive status.

Figure 4:
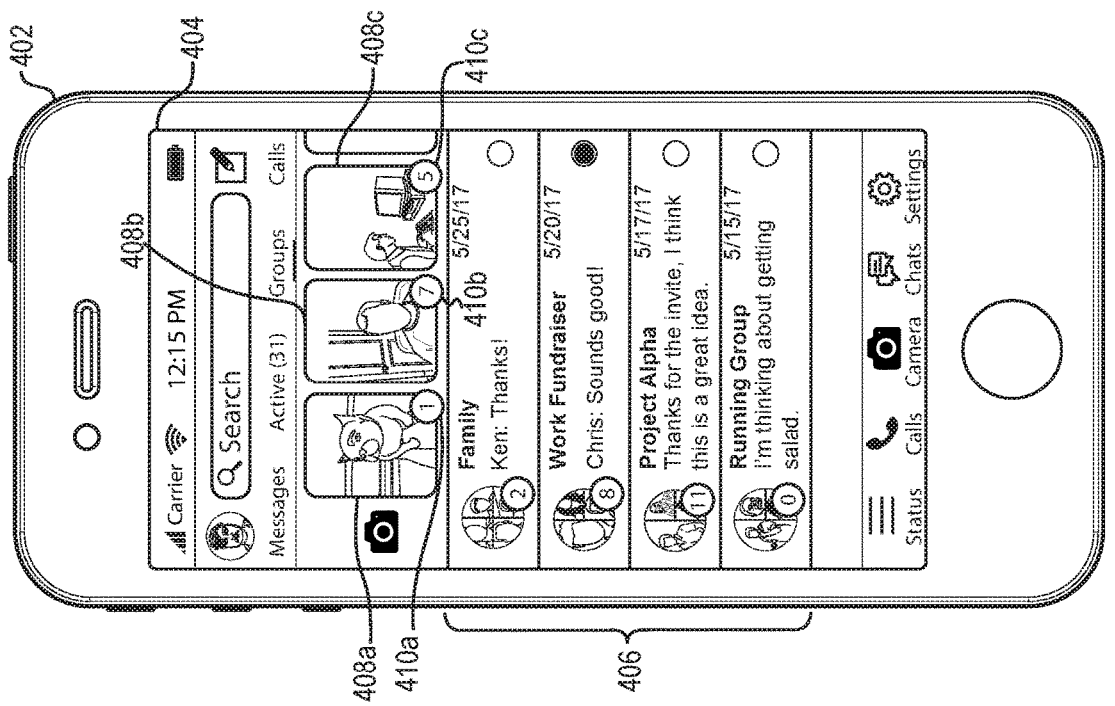
FIG. 4 illustrates a computing device portraying another example graphical user interface including group activity indicators in accordance with one or more embodiments.

As mentioned above, in one or more embodiments, the group activity system 116 also operates in conjunction with digital forums that include ephemeral digital content. For example, FIG. 4 illustrates an example mobile device 402 that includes a graphical user interface 404 including graphical icons corresponding to digital forums that include a combination of permanent and ephemeral digital content. For example, the graphical user interface 404 includes a listing 406 of graphical icons including similar features and characteristics as graphical icons described above in connection with FIGS. 2A-3. In addition, as shown in FIG. 4, the graphical user interface 404 includes ephemeral graphical icons 408a-c associated with digital forums in which ephemeral digital content is shared between users of the networking system 104. In particular, similar to one or more embodiments described herein, each of the ephemeral graphical icons 408a-c indicate a digital forum accessible to a networking group including the user of the mobile device 402 and a number of additional co-users of the networking system 104.

As further shown in FIG. 4, the group activity system 116 can generate group activity indicators reflecting a level of activity for each of the ephemeral digital forums. In particular, each of the ephemeral graphical icons 408a-c include a group activity indicator 410a-c that includes an indication of a number of active co-users of the networking system 104.

The group activity system 116 can generate a variety of different group activity indicators for ephemeral digital forums. For example, although FIG. 3 illustrates numerical group activity indicators (i.e., group activity indicators that portray an actual number), the group activity system 116 can utilize group activity indicators that are shapes (e.g., a circle such as the group activity indicator 214a), logos, or profile images (e.g., profile images of active co-users). Similarly, the group activity system 116 can present a group activity indicator by modifying the size of the ephemeral graphical icons 408a-408c. The group activity system 116 can also modify the order of the ephemeral graphical icons 408a-408c based on the active co-users within networking groups.

Furthermore, the group activity system 116 can generate various group activity indicators based on a variety of different user interactions. Indeed, the group activity system 116 can generate a group activity indicator reflecting a number of co-users that have recently interacted with the networking system 104 (e.g., within a threshold period of time such as the predefined period of time that digital content is available via the ephemeral digital forum). Similarly, the group activity system 116 can provide a group activity indicator reflecting the number of co-users that have viewed ephemeral digital content shared within an ephemeral digital forum. In addition, the group activity system 116 can provide a group activity indicator reflecting the number of co-users that are currently interacting with an ephemeral digital forum (e.g., viewing ephemeral digital content, composing ephemeral digital content, or adding ephemeral digital content). Similarly, the group activity system 116 can provide a group activity indicator based on the number of co-users that have contributed ephemeral digital content currently available in the ephemeral digital forum.

Moreover, the group activity system can apply one or more threshold values for one or more of these user interactions and generate a group activity indicator when the number (or percentage) of co-users satisfies the threshold. For example, the group activity system can apply a group activity indicator threshold that surfaces a group activity indicator based on a combination of various user interactions. To illustrate, the group activity system can generate and provide a group activity indicator where at least two co-users have viewed ephemeral digital content currently available via an ephemeral digital forum and at least two co-users are running the networking system application 110.

Accordingly, as shown in FIG. 4, the graphical user interface 404 includes graphical icons associated with a combination of permanent and ephemeral digital content shared via digital forums. The group activity system 116 can apply the same or different thresholds in determining when to surface group activity indicators for different types of digital forums. For instance, in one or more embodiments, the group activity system 116 indicates an activity status differently between digital forums including permanent digital content and ephemeral digital content. For example, the group activity system 116 may determine and indicate that an ephemeral digital forum is active based on a first number of active co-users. Alternatively, the group activity system 116 may require a higher number or percentage of active co-users prior to determining that a permanent (i.e., non-ephemeral) digital forum is active.

Figure 5:
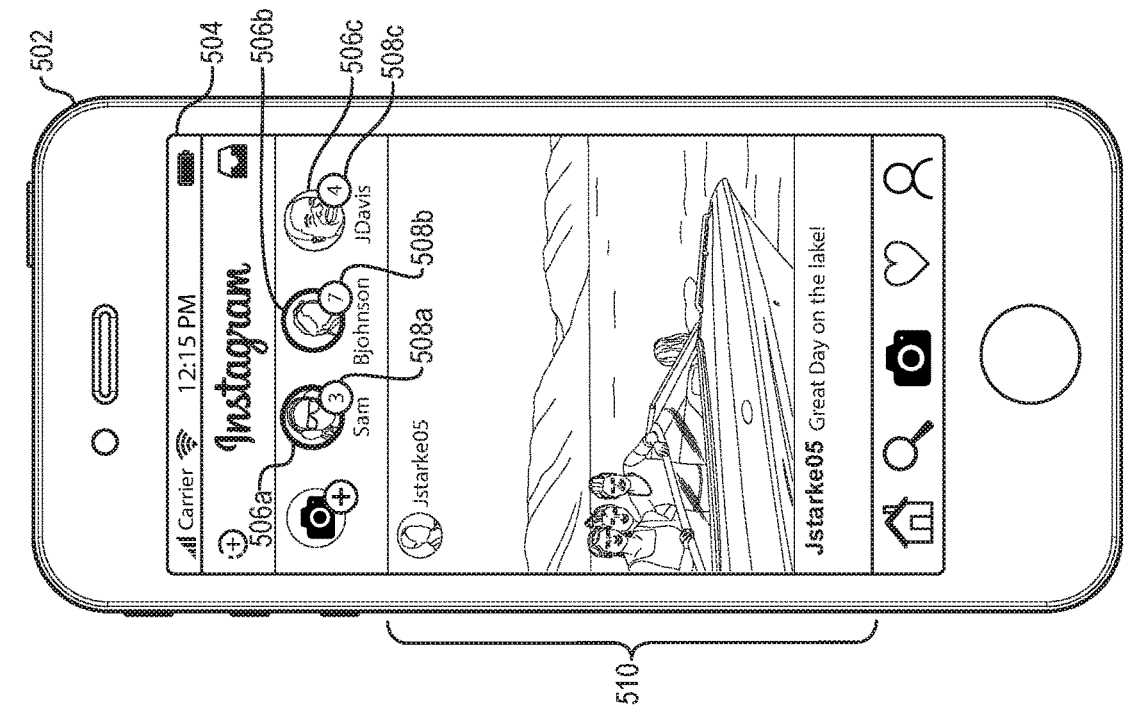
FIG. 5 illustrates a computing device portraying another example graphical user interface including group activity indicators in accordance with one or more embodiments.

As mentioned above, the group activity system 116 can display group activity indicators in a variety of ways to portray a level of activity of a networking group within an ephemeral digital forum. For example, FIG. 5 illustrates another example of a mobile device 502 including a graphical user interface 504 for displaying graphical icons corresponding to ephemeral digital forums in accordance with one or more embodiments of the group activity system 116. For example, as shown in FIG. 5, the graphical user interface 504 includes a listing of ephemeral graphical icons 506a-c corresponding to ephemeral digital forums. In particular, the ephemeral graphical icons 506a-c include selectable links to ephemeral digital forums corresponding to one or more respective co-users of the networking system 104 or to respective networking groups including multiple co-users of the networking system 104.

As shown in FIG. 5, the group activity system 116 provides group activity indicators 508a-c with the ephemeral graphical icons 506a-c that indicate a level of activity among co-users of the networking system 104 having access to the ephemeral digital forums. For example, the group activity indicators 508a-c include an indication of a number of active co-users within a networking group having access to the ephemeral digital forums. Specifically, the group activity indicators 508a-c include an indication of a number of total co-users within the networking group that have viewed or otherwise interacted with the ephemeral digital content currently available in the ephemeral digital forum.

In addition, as mentioned, the group activity system 116 can provide additional group activity indicators reflecting an active (or inactive) status for an ephemeral digital forum. For example, as shown in FIG. 5, the group activity system 116 causes the first and second ephemeral graphical icons 506a-b to have a bold outline indicating each ephemeral digital forum is active (e.g., each ephemeral digital forum satisfies a threshold number or percentage of co-users that are currently viewing or have recently viewed the ephemeral digital forums). As shown in FIG. 5, however, the third ephemeral graphical icon 506c is not bolded or otherwise emphasized indicating an inactive status for the corresponding ephemeral digital forum (e.g., the ephemeral digital forum does not satisfy a threshold number or percentage of co-users that are currently viewing or have recently viewed the ephemeral digital forum).

As further shown in FIG. 5, the graphical user interface 504 includes a display area 510 including digital content shared via the networking system 104. For example, in one or more embodiments, the display area 510 includes a display of a social networking feed for a particular user (e.g., digital content shared with the user of the mobile device 502 from other co-user of the networking system 104). As an alternative, in one or more embodiments, the display area 510 includes a social networking group feed (e.g., a digital forum for a networking group including digital content shared or otherwise added to the digital forum and accessible to any member within the networking group).

Figure 6:
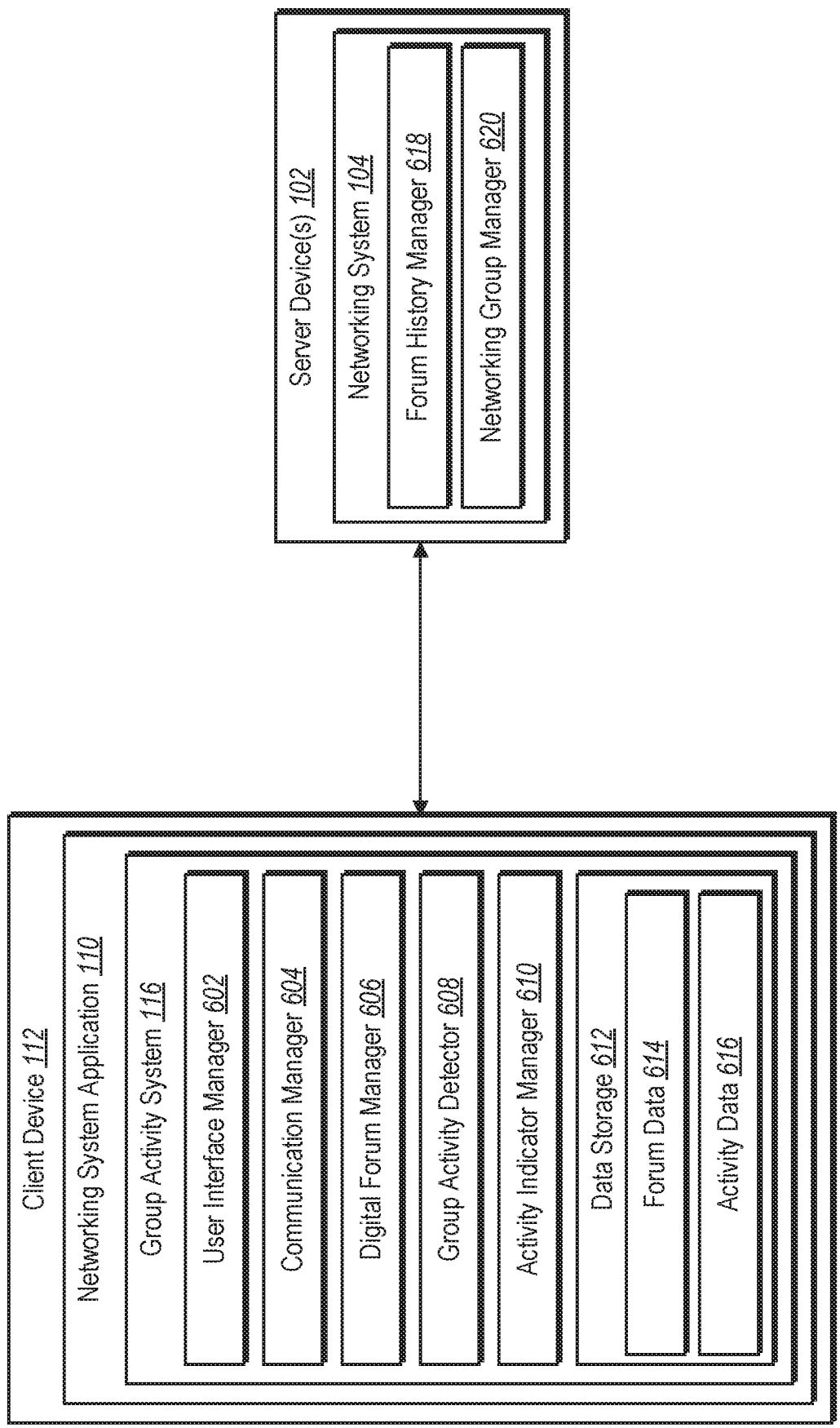
FIG. 6 illustrates a schematic diagram of an example group activity system implemented on a client device in accordance with one or more embodiments.

Turning now to FIG. 6, additional detail will be provided regarding components and capabilities of an example architecture for the group activity system 116 that may be implemented on the client device 112, server device(s) 102, or on a combination of the server device(s) 102 and the client device 112. In particular, FIG. 6 illustrates one implementation of the server device(s) 102 and the client device 112 having similar features and functionality associated with one or more embodiments described above. For example, the group activity system 116 and the networking system 104 cooperate to provide features and functionality of digital forums accessible to corresponding networking groups to a user of the client device 112. In addition, the group activity system 116 facilitates providing one or more group activity indicators associated with a number of active co-users within one or more corresponding networking groups.

In particular, as shown in FIG. 6, the client device 112 includes a networking system application 110. The networking system application 110 includes the group activity system 116, which includes a user interface manager 602, a communication manager 604, a digital forum manager 606, a group activity detector 608, an activity indicator manager 610 and a data storage 612 including forum data 614 and activity data 616. As further shown, FIG. 6 illustrates an example server device(s) 102 including a networking system 104, which includes a forum hosting manager 618 and networking group manager 620.

While FIG. 6 shows one example embodiment in which the components 602-612 are implemented on the client device 112 and components 618-620 are implemented on the server device(s) 102, it will be understood that the components 602-612 and 618-620 may be implemented wholly or partially on the client device 112, the server device(s) 102, or a combination of both (and/or via the co-user devices 106a-n, as discussed above). In addition, while FIG. 6 shows that the data storage 612 is implemented entirely on the client device, in one or more embodiments, the information contained within the data storage 612 can be located within a corresponding data storage on the server device(s) 102 and/or stored collectively between data storages accessible to the client device 112 and/or the server device(s) 102.

As discussed in one or more embodiments, the group activity system 116 can provide a graphical user interface via a display of the client device 112. For example, as shown in FIG. 6, the group activity system 116 includes a user interface manager 602 that provides a graphical user interface via the client device 112. In one or more embodiments, the user interface manager 602 generates, creates, and/or provides any graphical user interface associated with the networking system 104. Examples of the group activity system 116 causing the client device 112 to provide a graphical user interface are described above in connection with FIGS. 2A-5. Accordingly, the user interface manager 602 enables a user of the client device 112 to share digital content with co-users of the networking system 104. In addition, the user interface manager 602 enables the user of the client device 112 to interact with digital content shared by co-users of the networking system 104.

As further shown in FIG. 6, the group activity system 116 includes a communication manager 604 that manages communication of data to and from the client device 112. For example, as mentioned above, in one or more embodiments, the group activity system 116 receives activity information for users belonging to various networking groups, including data about interactions by co-users of the networking groups with respect to the networking system 104 and/or with respect to individual digital forums. In one or more embodiments, the communication manager 604 determines how the interaction information is received and/or disseminated.

For example, in one or more embodiments, the communication manager 604 facilitates communication directly between the client device 112 and the server device(s) 102. In particular, in one or more embodiments, the networking system 104 causes the server device(s) 102 to communicate activity information to the client device 112 for networking groups to which the user of the client device 112 belongs. For example, where a user of the client device 112 belongs to a networking group, the networking system 104 may communicate an activity status for the networking group based on a determined number of active co-users within the networking group. In one or more embodiments, rather than determining an activity status for the networking group at the server device(s) 102, the networking system 104 communicates individual activity information for co-users (e.g., recent interactions, real-time interactions) enabling the group activity system 116 to locally determine an activity status for the networking group. Alternatively, in one or more embodiments, the networking system 104 does not determine the activity status of the networking group and/or individual co-users within the networking group, thus enabling the group activity system 116 to locally determine the activity status for the networking group based on detectable interactions from the client device 112 having the networking system application 110 thereon.

Rather than receiving information about networking groups directly from the server device 104 (which enables the group activity system 116 to locally determine the activity status for networking groups), in one or more embodiments, the communication manager 604 communicates between the client device 112 and co-user devices. For example, in one or more embodiments, the communication manager 604 causes the client device 112 to transmit activity information (e.g., whether a user is logged on, whether a user is viewing a digital forum, whether a user is interacting with a digital forum, etc.) to co-users within common networking groups. In one or more embodiments, the group activity system 116 implemented on co-user devices similarly causes the co-user devices to transmit activity information to the user of the client device 112 and other co-users within common networking groups. The client device 112 (and/or the co-user devices) can then analyze the activity information directly.

In one or more embodiments, the communication manager 604 reduces the expense of resources of the networking system 104 by managing communications between the client device 112 and the server device(s) 102. For example, as mentioned above, in one or more embodiments, the communication manager 604 causes the client device 112 and co-user devices to communicate activity information between co-users of common networking groups, thus reducing the amount of activity information transmitted via the server device(s) 102. In particular, where the networking system 104 is hosting thousands or millions of networking groups associated with millions or billions of respective co-users, the group activity system 116 may determine and provide group activity indictors described herein while leveraging processing capabilities of the client device 112 and co-user devices.

As further shown in FIG. 6, the group activity system 116 includes a digital forum manager 606 that manages interactions by the user of the client device 112 with respect to digital forums hosted by the networking system 104. For example, in one or more embodiments, the digital forum manager 606 provides a list digital forums (and/or corresponding graphical icons) to which the user of the client device 112 has access. In one or more embodiments, the digital forum manager 606 provides a list of digital forums (e.g., a list of graphical icons) in accordance with a determined activity level or recent interactions by the user with respect to the different digital forums.

In addition, in one or more embodiments, the digital forum manager 606 enables the user of the client device to interact with digital forums. For example, in one or more embodiments, the digital forum manager 606 provides a graphical user interface via the user interface manager 602 including graphical icons associated with different digital forums and enables a user of the client device to select the graphical icons. Upon detecting a user selection of a graphical icon, the digital forum manager 606 can cause the user interface manager 602 to provide a presentation of a graphical user interface for the digital forum including a display of digital content shared via the digital forum as well as any messages shared between the networking group associated with the selected digital forum.

As further shown in FIG. 6, the group activity system 116 includes a group activity detector 608 that determines a level of activity for different networking groups. For example, the group activity detector 608 can determine an activity status for a given networking group based on an identified number of active co-users within the networking group. For example, the group activity detector 608 can determine whether a number of active co-users within a networking group exceeds one or more thresholds and identify a level of activity for the networking group based on a comparison of the number of active co-users with the one or more thresholds.

As described above, the group activity detector 608 can determine an activity status for a networking group based on various types of detected actions of the co-users within the networking group. For example, in one or more embodiments, the group activity detector 608 determines an activity status for the networking group based on detected interactions of co-user devices with respect to the networking system 104. In addition, or as an alternative, the group activity detector 608 can determine an activity status for the networking group based on detected interactions with respect to a digital forum associated with the networking group.

As further shown in FIG. 6, the group activity system 116 includes an activity indicator manager 610 that generates, creates, and/or provides group activity indicators for corresponding networking groups. In particular, the activity indicator manager 610 generates a group activity indicator associated with a determined level of activity for a corresponding networking group. In one or more embodiments, the activity indicator manager 610 generates a group activity indicator based on a number of active co-users within a networking group as well as detected types of activities by the active co-users of the networking group.

In addition to generating the group activity indicators, the activity indicator manager 610 additionally causes the user interface manager 602 to provide the group activity indicator via a graphical user interface of the client device 112. For example, the activity indicator manager 610 generates an icon, number, or other visual indicator to display in connection with a graphical icon associated with a digital forum (and associated with an networking group) and provides the icon, number or other visual indicator in connection with the graphical icon for the respective digital forum. In one or more embodiments, the activity indicator manager 610 generates and provides multiple group activity indicators for individual networking groups (e.g., based on a number of active co-users and types of detected interactions of the active co-uses with respect to the networking system 104).

As further shown in FIG. 6, the group activity system 116 includes a data storage 612 including forum data 614. The forum data 614 can include any information associated with digital forums hosted by the networking system 104. In particular, the forum data 614 can include an identification of any forums to which the user of the client device 112 has access. In addition, the forum data 614 can include digital content accessible via the digital forums to which the user has access. In addition, in one or more embodiments, the forum data 614 includes an identification of any co-users of networking groups associated with respective digital forums.

As further shown, the data storage 612 includes activity data 616. The activity data 616 includes any information associated with interactions by co-users of a networking group with respect to the networking system 104. For example, activity data 616 can include an identification of one or more co-users who are logged on to the networking system 104 or co-users who are running the networking system application 110. The activity data 616 can further include actions of co-users with respect to the networking system 104 (e.g., shares, ratings, comments, messages, etc.) In one or more embodiments, the activity data 616 further includes information about interactions with respect to a specific digital forum. For example, the activity data 616 can include information about whether a co-user is currently viewing a digital forum, whether a co-user has recently interacted with the digital forum, and/or whether a user is currently viewing or otherwise interacting with the digital forum.

As further shown in FIG. 6, the networking system 104 on the server device(s) 102 includes a forum hosting manager 618. The forum hosting manager 618 can host any number of digital forums over which co-users can communicate and share digital content. For example, the forum hosting manager 618 can generate or otherwise provide access to virtual spaces to users of the networking system 104 that enables the users of the networking system 104 to communicate over the digital forum as well as share digital content therein. For example, the forum hosting manager 618 can manage instant messaging threads, chat forums, ephemeral digital forums, or social networking groups.

As further shown, the networking system includes a network group manager 620. In one or more embodiments, the network group manager 620 manages access to the digital forums via networking groups. For example, the network group manager 620 can create and manage networking groups including any number of co-users of the networking system 104. In addition, the forum hosting manager 618 can associate a digital forum with a networking group and allow any co-user of the networking system 104 that belongs to the networking group to have access to the digital forum. In one or more embodiments, the forum hosting manager 618 provides different levels of access within the same networking groups (e.g., administrator, creator, member, etc.)

In addition to utilizing processing capabilities of the client device 112 and/or co-user devices, in one or more embodiments, the group activity system 116 reduces the amount of activity information transmitted by the server device(s) 102 by causing the networking system 104 to selectively provide activity information for networking groups. For example, in one or more embodiments, the group activity system 116 causes the networking system 104 to provide activity information for networking groups under limited conditions. In particular, in one or more embodiments, the group activity system 116 associates one or more activity conditions with respective networking groups that facilitates selective communication of activity information for the networking groups. For example, in one or more embodiments, the group activity system 116 facilitates selective communication of activity information by requesting (e.g., from the networking system 104) group activity information upon detecting one or more activity conditions for one or more networking groups.

As an illustrative example, a user of the client device 112 may create or otherwise belong to a networking group for a specific holiday or event (e.g., New Years) which has an active status for a limited period of time (e.g., 2-3 days) and which periodically becomes active (e.g., once/year). Rather than continuously providing activity information for the networking group and/or individual co-users for the networking group, the group activity system 116 or networking system 104 may facilitate communication of activity information for the limited period of time associated with the holiday or event.

As another example, a user of the client device 112 may create or otherwise belong to a networking group associated with a specific location. For example, where the user and co-users of the networking group periodically attend an amusement park, the networking group may become active for a day or other limited period of time and subsequently become inactive when the user and co-users are no longer at the park. Accordingly, in one or more embodiments, the group activity system 116 and/or networking system 104 may facilitate selective communication of activity information upon detecting that a threshold number of the co-user devices and client device 112 are located at the amusement park. Upon detecting that fewer than a threshold number of the co-user devices and client device 112 are located at the amusement park, the group activity system 116 and/or networking system 104 may stop communicating activity information about the networking group.

In one or more embodiments, the group activity system 116 selectively provides activity information for networking groups based on activity level (e.g., provide activity information based on detecting that one or more users of the networking group are logged into the networking system 104 and/or using the networking system application 110). For instance, rather than continually monitoring a group activity level for a networking group and pushing status updates to co-users of the group, the group activity system 116 can initiate monitoring an activity status for a networking group upon detecting that one or more co-users of the networking group are active. In addition, upon detecting that no co-users of a networking group are active, the group activity system 116 can similarly stop monitoring an activity status for the networking group.

Each of the components 602-620 as shown in FIG. 6 may be part of the group activity system 116 and may be in communication with one another using any suitable communication technologies. It will be recognized that although components 602-620 are shown to be separate in FIG. 6, any of components 602-620 may be combined into fewer components, such as into a single facility or module, divided into more components, or configured into different components as may serve a particular embodiment.

The components 602-620 of the group activity system 116 can comprise software, hardware, or both. For example, the components 602-620 can comprise one or more instructions stored on a computer-readable storage medium and executable by processors of one or more computing devices. When executed by the one or more processors, the computer-executable instructions of the group activity system 116 can cause a client device and/or a server device to perform the methods described herein. Alternatively, the components 602-620 and their corresponding elements can comprise hardware, such as a special purpose processing device to perform a certain function or group of functions. Additionally, the components 602-620 can comprise a combination of computer-executable instructions and hardware.

Furthermore, the components 602-620 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-620 may be implemented as a stand-alone application, such as a desktop or mobile application. Furthermore, the components 602-620 may be implemented as one or more web-based applications hosted on a remote server. The components 602-620 may also be implemented in a suit of mobile device applications or "apps."

FIGS. 1-6, the corresponding text, and the examples, provide a number of different systems and devices that facilitate management of digital forums utilizing group activity indicators. In addition to the foregoing, embodiments can also be described in terms of flowcharts comprising acts in a method for accomplishing a particular result. For example, FIG. 7 illustrates a flowchart of an exemplary method for generating and providing one or more group activity indicators that reflect a current activity status for a respective networking group.

Figure 7:
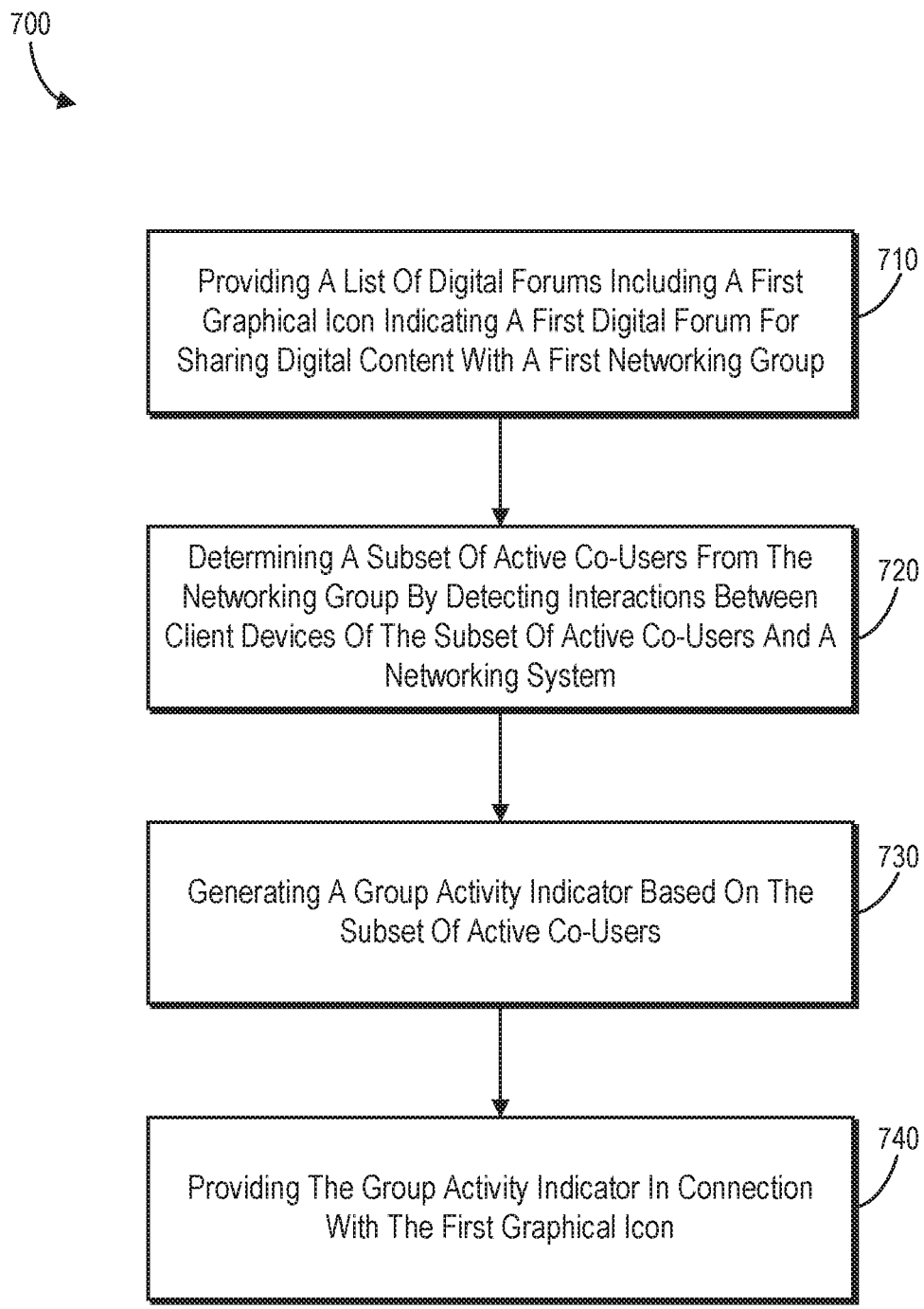
FIG. 7 illustrates a flowchart of a series of acts in a method for providing a group activity indicator in accordance with one or more embodiments.

FIG. 7 illustrates a flowchart of one example method 700 for generating and providing one or more group activity indicators in accordance with one or more embodiments described herein. As shown in FIG. 7, the method 700 includes an act 710 of providing a list of digital forums including a first graphical icon indicating a first digital forum for sharing digital content with a first networking group. For example, in one or more embodiments, the act 710 includes providing, for display via a graphical user interface of a client device 112, a list of digital forums for sharing digital content, the list including a first graphical icon indicating a first digital forum for sharing digital content with the first networking group. In addition, the first networking group includes the user of the client device 112 and a plurality of co-users (e.g., co-users 108a-n) of the networking system 104.

In one or more embodiments, the digital forum includes a messaging thread of the networking group. The messaging thread can include digital content shared between the user 114 and the plurality of co-users of the networking system 104. In one or more embodiments, the digital forum includes an ephemeral digital forum. The ephemeral digital forum can include ephemeral digital content shared between the user 114 and the plurality of co-users of the networking system 104 that expires within a predefined period of time.

As further shown in FIG. 7, the method 700 includes an act 720 of determining a subset of active co-users from the networking group by detecting interactions between client devices (e.g., co-user devices 106a-n) of the subset of active co-users and the networking system 104. For example, in one or more embodiments, the act 720 includes determining a first subset of co-users from a plurality of co-users by detecting interactions between client devices of the first subset of active co-users and the networking system 104. In one or more embodiments, the method 700 includes receiving, at the client device and directly from the client devices associated with the first subset of active co-users, interaction data reflecting the interactions between the client devices of the first subset of active co-users and the networking system 104.

In one or more embodiments, determining the first subset of co-users includes identifying co-users of the plurality of co-users accessing the digital content shared within a messaging thread. Moreover, in one or more embodiments, determining the first subset of active co-users from the plurality of co-users includes identifying co-users of the plurality of co-users that have interacted with the ephemeral digital content prior to expiration of a predefined period of time. Further, determining the first subset of active co-users can include determining that the client devices of the first subset of active co-users are running an application for accessing the networking system 104. In addition, in one or more embodiments, determining the first subset of active co-users includes at least one of determining that client devices of the first subset of co-users are accessing the first digital forum, determining that client devices of the first subset of co-users are composing a message within a messaging interface of the first digital forum, or determining that client devices of the first subset of co-users have added digital content to the first digital forum within a predetermined period of time.

As further shown in FIG. 7, the method 700 includes an act 730 of generating a group activity indicator based on the subset of active co-users. For example, in one or more embodiments, the act 730 includes generating a group activity indicator based on the first subset of active co-users. To illustrate, the act 730 can include generating a group activity indicator that reflects a number of active co-users.

Moreover, as shown in FIG. 7, the method 700 includes an act 740 of providing the group activity indicator in connection with the group activity icon. For example, in one or more embodiments, the act 740 includes providing, for display via a graphical user interface of the client device 112, the group activity indicator in connection with the first graphical icon indicating the first digital forum for exchanging digital content with the first networking group. In one or more embodiments, the method 700 includes determining the first subset of active co-users from the plurality of co-users by determining a number of active co-users from the plurality of co-users of the first networking group. In addition, in one or more embodiments, the group activity indicator reflects the number of active co-users.

In one or more embodiments, the method 700 includes determining a second subset of active co-users from the plurality of co-users by detecting one or more additional interactions between client devices of the second subset of active co-users and the networking system 104. In addition, in response to detecting the one or more additional interactions, the method 700 can further include generating a modified group activity indicator based on the second subset of active co-users and further providing, via the graphical user interface of the client device 112, the modified group activity indicator in connection with the graphical icon indicating the first digital forum for sharing digital content with the first networking group. In one or more embodiments, generating the modified group activity indicator includes one or more of: changing a color of the group activity indicator, changing a brightness of the group activity indicator, changing a size of the group activity indicator, changing a shape of the group activity indicator, or modifying a number within the group activity indicator to reflect a number of the second subset of active co-users.

Figure 8:
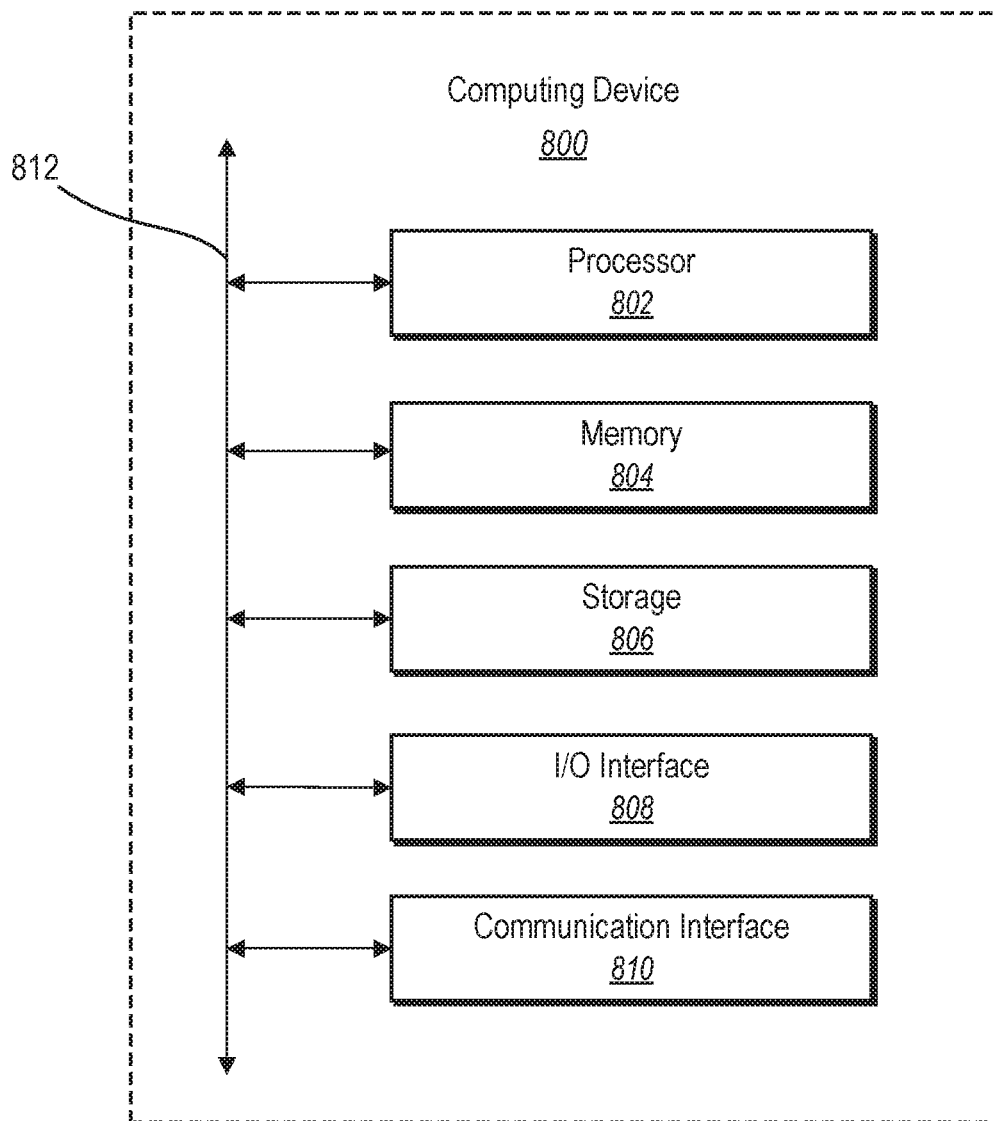
FIG. 8 illustrates a block diagram of an example computing device in accordance with one or more embodiments.

FIG. 8 illustrates, in block diagram form, an exemplary computing device 800 that may be configured to perform one or more of the processes described above. In one or more embodiments, the server device(s) 102, co-user devices 106a-n, client device 112, mobile devices 202, 302, 402 each comprise one or more computing devices in accordance with implementations of computing device 800. As shown by FIG. 8, the computing device can comprise a processor 802, a memory 804, a storage device 806, an I/O interface 808, and a communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, in one or more embodiments, the networking system 104 is linked to and/or is implemented a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 9:
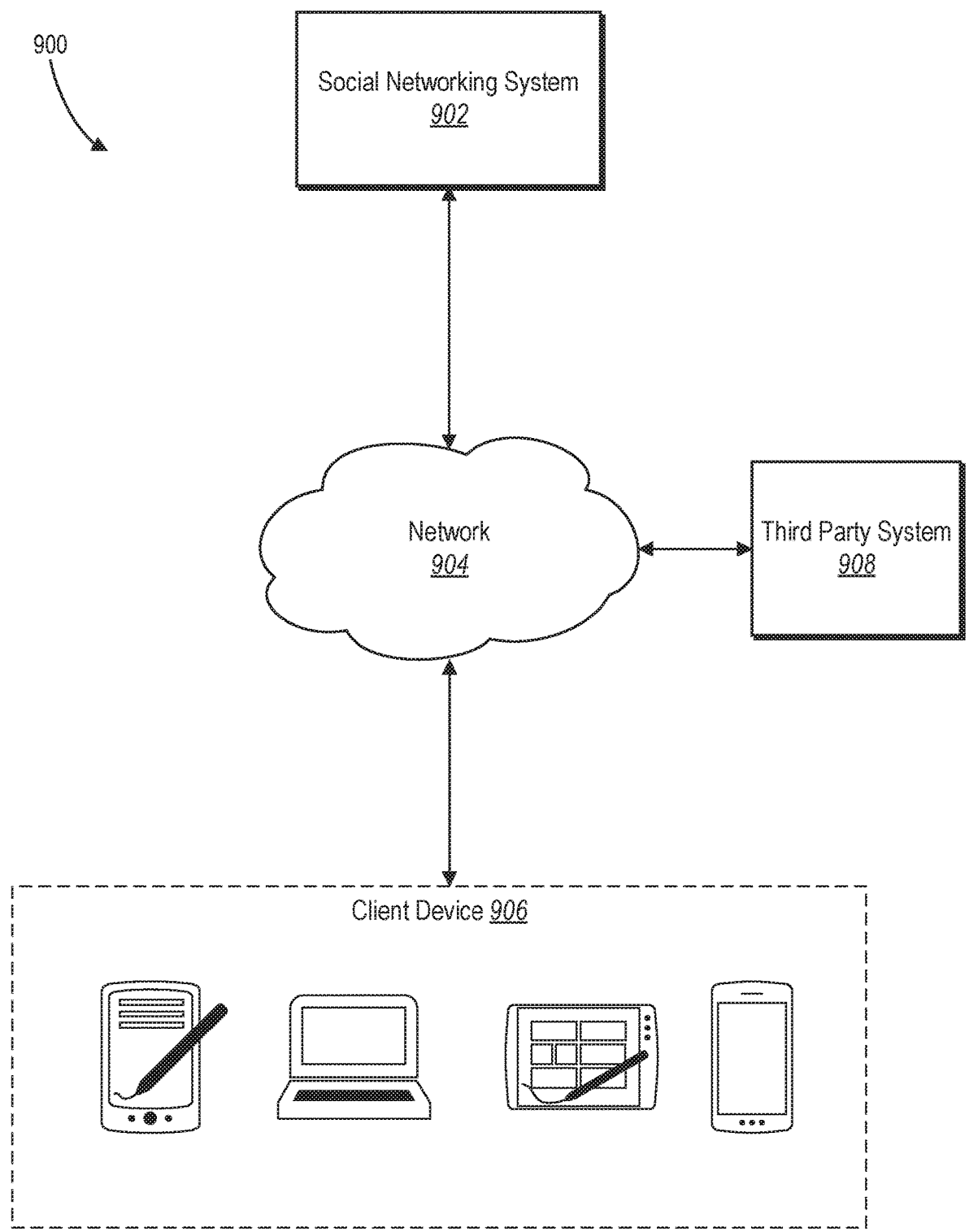
FIG. 9 illustrates an example network environment of a social networking system in accordance with one or more embodiments.

FIG. 9 illustrates an example network environment 900 of a social-networking system. In particular embodiments, a social-networking system 902 may comprise one or more data stores. In particular embodiments, the social-networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 902 may comprise one or more computing devices (e.g., servers) hosting functionality directed to operation of the social-networking system 902. A user of the social-networking system 902 may access the social-networking system 902 using a client device such as client device 906. In particular embodiments, the client device 906 can interact with the social-networking system 902 through a network 904.

The client device 906 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access the social-networking system 902.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 10:
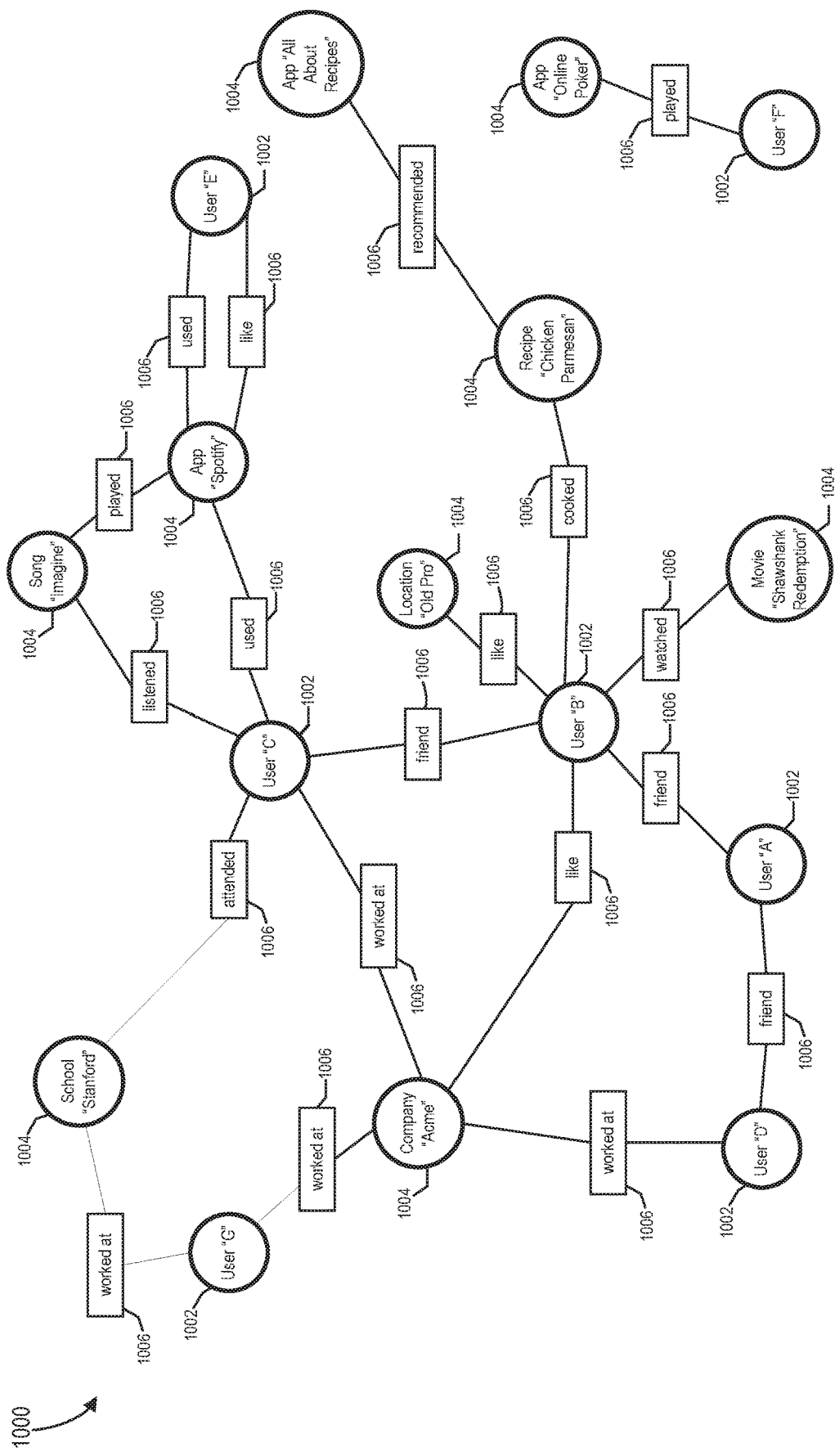
FIG. 10 illustrates a social graph in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client device 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party system 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client device 906) may indicate that he or she likes the concept represented by the concept node 1004 by clicking or selecting a "Like" icon, which may cause the user's client device 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph

1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client device 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:

providing, for display via a graphical user interface of a client device, a list of digital forums for sharing digital content, the list comprising a first graphical icon indicating a first digital forum for sharing digital content with a first networking group, the first networking group comprising a user of the client device and a plurality of co-users of a networking system;

determining a first subset of active co-users from the plurality of co-users by detecting interactions between client devices of the first subset of active co-users and the networking system;

generating a group activity indicator based on a proportion of the first subset of active co-users to the plurality of co-users meeting a threshold proportion value, wherein the group activity indicator reflects a level of activity for the group;

providing, for display via the graphical user interface of the client device, the group activity indicator in connection with the first graphical icon indicating the first digital forum for exchanging digital content with the first networking group;

determining a second subset of active co-users from the plurality of co-users;

determining that the second subset of active co-users falls below the threshold proportion value;

in response to determining that the second subset of active co-users falls below the threshold proportion value, generating an inactive group activity indicator; and providing, via the graphical user interface of the client device, the inactive group activity indicator together with the first graphical icon indicating the first digital forum for sharing digital content with the first networking group.

2. The method of claim 1, wherein generating the inactive group activity indicator comprises one or more of: changing a color of the group activity indicator, changing a brightness of the group activity indicator, changing a size of the group activity indicator, changing a shape of the group activity indicator, or modifying a number within the group activity indicator to reflect the proportion of the second subset of active co-users.

3. The method of claim 1, wherein:
the first digital forum comprises a messaging thread of the first networking group, wherein the messaging thread comprises digital content shared between the user and the plurality of co-users of the networking system; and
wherein determining the first subset of active co-users from the plurality of co-users comprises identifying co-users of the plurality of co-users accessing the digital content shared within the messaging thread.

4. The method of claim 1, wherein the first digital forum comprises an ephemeral digital forum, wherein the ephemeral digital forum comprises ephemeral digital content shared between the user and the plurality of co-users of the networking system that expires within a predefined period of time; and
wherein determining the first subset of active co-users from the plurality of co-users comprises identifying co-users of the plurality of co-users that have interacted with the ephemeral digital content prior to expiration of the predefined period of time.

5. The method of claim 1, wherein determining the first subset of active co-users comprises determining that the client devices of the first subset of active co-users are running an application for accessing the networking system.

6. The method of claim 1, wherein determining the first subset of active co-users further comprises at least one of: determining that the client devices of the first subset of active co-users are accessing the first digital forum, determining that the client devices of the first subset of active co-users are composing a message within a messaging interface of the first digital forum, or determining that the client devices of the first subset of active co-users have added digital content to the first digital forum within a predetermined period of time.

7. The method of claim 1, further comprising:
determining a third subset of active co-users from the plurality of co-users by detecting one or more additional interactions between client devices of the third subset of active co-users and the networking system; and
in response to detecting the one or more additional interactions,
generating a modified group activity indicator based on the proportion of the third subset of active co-users to the plurality of co-users meeting a second threshold proportion value, wherein the second threshold proportion value is greater than the threshold proportion value; and
providing, via the graphical user interface of the client device, the modified group activity indicator in connection with the first graphical icon indicating the first digital forum for sharing digital content with the first networking group.

8. The method of claim 7, wherein generating the modified group activity indicator comprises one or more of: changing a color of the group activity indicator, changing a brightness of the group activity indicator, changing a size of the group activity indicator, changing a shape of the group activity indicator, or modifying a number within the group activity indicator to reflect a number of the second subset of active co-users.

9. The method of claim 1, wherein the plurality of co-users comprises the first subset of active co-users and one or more inactive co-users.

10. A system comprising:
at least one processor; and
at least one non-transitory computer readable storage medium storing instructions thereon that, when executed by the at least one processor, cause the system to:
provide, for display via a graphical user interface of a client device, a list of digital forums for sharing digital content, the list comprising a first graphical icon indicating a first digital forum for sharing digital content with a first networking group, the first networking group comprising a user of the client device and a plurality of co-users of a networking system;
determine a first subset of active co-users from the plurality of co-users by detecting interactions between client devices of the first subset of active co-users and the networking system;
generate a group activity indicator based on a proportion of the first subset of active co-users to the plurality of co-users meeting a threshold proportion value, wherein the group activity indicator reflects a level of activity for the group;
provide, for display via the graphical user interface of the client device, the group activity indicator in connection with the first graphical icon indicating the first digital forum for exchanging digital content with the first networking group;
determine a second subset of active co-users from the plurality of co-users;
in response to determining that the second subset of active co-users falls below the threshold proportion value, generate an inactive group activity indicator; and
provide, via the graphical user interface of the client device, the inactive group activity indicator in connection with the first graphical icon indicating the first digital forum for sharing digital content with the first networking group.

11. The system of claim 10, further comprising instructions that, when executed by the at least one processor, cause the system to generate the inactive group activity indicator by at least one of: changing a color of the group activity indicator, changing a brightness of the group activity indicator, changing a size of the group activity indicator, changing a shape of the group activity indicator, or modifying a number within the group activity indicator to reflect the proportion of the second subset of active co-users.

12. The system of claim 10,
wherein the first digital forum comprises a messaging thread of the first networking group, wherein the messaging thread comprises digital content shared between the user and the plurality of co-users of the networking system; and
further comprising instructions that, when executed by the at least one processor, cause the system to determine the first subset of active co-users from the plurality of co-users by identifying co-users of the plurality of co-users accessing the digital content shared within the messaging thread.

13. The system of claim 10,
wherein the first digital forum comprises an ephemeral digital forum, wherein the ephemeral digital forum comprises ephemeral digital content shared between the user and the plurality of co-users of the networking system that expires within a predefined period of time; and further comprising instructions that, when executed by the at least one processor, cause the system to determine the first subset of active co-users from the plurality of co-users by identifying co-users of the plurality of co-users that have interacted with the ephemeral digital content prior to expiration of the predefined period of time.

14. The system of claim 10, further comprising instructions that, when executed by the at least one processor, cause the system to determine the first subset of active co-users by at least one of: determining that the client devices of the first subset of active co-users are running an application for accessing the networking system, determining that the client devices of the first subset of active co-users are accessing the first digital forum, determining that the client devices of the first subset of active co-users are composing a message within a messaging interface of the first digital forum, or determining that the client devices of the first subset of active co-users have added digital content to the first digital forum within a predetermined period of time.

15. The system of claim 10, further comprising instructions that, when executed by the at least one processor, cause the system to:
determine a third subset of active co-users from the plurality of co-users by detecting one or more additional interactions between client devices of the third subset of active co-users and the networking system; and
in response to detecting the one or more additional interactions,
generate a modified group activity indicator based on the proportion of the third subset of active co-users to the plurality of co-users meeting a second threshold proportion value, wherein:
the second threshold proportion value is greater than the threshold proportion value, and
generating the modified group activity indicator comprises one or more of: changing a color of the group activity indicator, changing a brightness of the group activity indicator, changing a size of the group activity indicator, changing a shape of the group activity indicator, or modifying a number within the group activity indicator to reflect the proportion of the second subset of active co-users; and
provide, via the graphical user interface of the client device, the modified group activity indicator in connection with the first graphical icon indicating the first digital forum for sharing digital content with the first networking group.

16. A non-transitory computer readable storage medium storing instructions thereon that, when executed by at least one processor, cause a computer system to:
provide, for display via a graphical user interface of a client device, a list of digital forums for sharing digital content, the list comprising a first graphical icon indicating a first digital forum for sharing digital content with a first networking group, the first networking group comprising a user of the client device and a plurality of co-users of a networking system;
determine a first subset of active co-users from the plurality of co-users by detecting interactions between client devices of the first subset of active co-users and the networking system;
generate a group activity indicator based on a proportion of the first subset of active co-users to the plurality of co-users meeting a threshold proportion value, wherein the group activity indicator reflects a level of activity for the group;
provide, for display via the graphical user interface of the client device, the group activity indicator in connection with the first graphical icon indicating the first digital forum for exchanging digital content with the first networking group; and
determine a second subset of active co-users from the plurality of co-users by detecting fewer interactions between client devices of the second subset of active co-users and the networking system;
in response to detecting the fewer interactions, generate an inactive group activity indicator based on the proportion of the second subset of active co-users to the plurality of co-users falling below the threshold proportion of the second subset of active co-users to the plurality of co-users falling below the threshold proportion value; and
provide, via the graphical user interface of the client device, the inactive group activity indicator in connection with the first graphical icon indicating the first digital forum for sharing digital content with the first networking group.

17. The non-transitory computer readable storage medium of claim 16, further comprising instructions that, when executed by the at least one processor, cause the computer system to generate the inactive group activity indicator by at least one of:
changing a color of the group activity indicator, changing a brightness of the group activity indicator, changing a size of the group activity indicator, changing a shape of the group activity indicator, or modifying a number within the group activity indicator to reflect the proportion of the second subset of active co-users.

18. The non-transitory computer readable storage medium of claim 16,
wherein the first digital forum comprises a messaging thread of the first networking group, wherein the messaging thread comprises digital content shared between the user and the plurality of co-users of the networking system; and
further comprising instructions that, when executed by the at least one processor, cause the computer system to determine the first subset of active co-users from the plurality of co-users by identifying co-users of the plurality of co-users accessing the digital content shared within the messaging thread.

19. The non-transitory computer readable storage medium of claim 16, further comprising instructions that, when executed by the at least one processor, cause the computer system to determine the first subset of active co-users by at least one of: determining that the client devices of the first subset of active co-users are running an application for accessing the networking system, determining that the client devices of the first subset of active co-users are accessing the first digital forum, determining that the client devices of the first subset of active co-users are composing a message within a messaging interface of the first digital forum, or determining that the client devices of the first subset of active co-users have added digital content to the first digital forum within a predetermined period of time.

20. The non-transitory computer readable storage medium of claim 16, further comprising instructions that, when executed by the at least one processor, cause the system to:
- determine a third subset of active co-users from the plurality of co-users by detecting one or more additional interactions between client devices of the third subset of active co-users and the networking system;
- in response to detecting the one or more additional interactions, generate a modified group activity indicator based on the proportion of the third subset of active co-users to the plurality of co-users meeting a second threshold proportion value, wherein:
  - the second threshold proportion value is greater than the threshold proportion value, and
  - generating the modified group activity indicator comprises one or more of: changing a color of the group activity indicator, changing a brightness of the group activity indicator, changing a size of the group activity indicator, changing a shape of the group activity indicator, or modifying a number within the group activity indicator to reflect the proportion of the second subset of active co-users; and
- provide, via the graphical user interface of the client device, the modified group activity indicator in connection with the first graphical icon indicating the first digital forum for sharing digital content with the first networking group.

* * * * *